(12) United States Patent
Ericksen et al.

(10) Patent No.: US 10,060,499 B2
(45) Date of Patent: Aug. 28, 2018

(54) METHOD AND APPARATUS FOR AN ADJUSTABLE DAMPER

(71) Applicant: Fox Factory, Inc., Watsonville, CA (US)

(72) Inventors: Everet Owen Ericksen, Santa Cruz, CA (US); Robert C. Fox, Los Gatos, CA (US); John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 14 days.

(21) Appl. No.: 13/934,067

(22) Filed: Jul. 2, 2013

(65) Prior Publication Data

US 2013/0292218 A1    Nov. 7, 2013

Related U.S. Application Data

(63) Continuation-in-part of application No. 13/843,704, filed on Mar. 15, 2013, now Pat. No. 9,033,122, and
(Continued)

(51) Int. Cl.
*F16F 9/08*    (2006.01)
*F16F 9/512*    (2006.01)
(Continued)

(52) U.S. Cl.
CPC ............ *F16F 9/5126* (2013.01); *B62K 25/08* (2013.01); *F16F 9/3292* (2013.01); *F16F 9/464* (2013.01); *B62K 2207/00* (2013.01)

(58) Field of Classification Search
CPC ......... B60G 17/08; B60G 21/06; F16F 9/512; F16F 9/465; F16F 9/5123; F16F 9/5126
(Continued)

(56) References Cited

U.S. PATENT DOCUMENTS

| 1,492,731 A | 5/1924 | Kerr |
| 1,575,973 A | 3/1926 | Coleman |

(Continued)

FOREIGN PATENT DOCUMENTS

| DE | 3532292 A1 | 3/1987 |
| DE | 3709447 A1 | 10/1988 |

(Continued)

OTHER PUBLICATIONS

Electronic Translation of DE3709447A1.
(Continued)

*Primary Examiner* — Bradley T King
*Assistant Examiner* — Mahbubur Rashid

(57) ABSTRACT

A system for controlling vehicle motion is described. The system includes: a first set of sensors coupled with a vehicle, the first set of sensors configured for sensing the vehicle motion; and a vehicle suspension damper coupled with the first set of sensors, the vehicle suspension damper configured for adjusting a damping force therein, the vehicle suspension damper comprising: a primary valve; a pilot valve assembly coupled with the primary valve, the pilot valve assembly configured for metering a flow of fluid to the primary valve, in response to at least the sensing; and an orifice block coupled with the primary valve and comprising a control orifice there through, the control orifice configured for operating cooperatively with the pilot valve assembly in the metering the flow of fluid to the primary valve.

21 Claims, 11 Drawing Sheets

Related U.S. Application Data a continuation-in-part of application No. 13/485,401, filed on May 31, 2012, now abandoned, application No. 13/934,067, which is a continuation-in-part of application No. 12/684,072, filed on Jan. 7, 2010, now abandoned, application No. 13/934,067, which is a continuation-in-part of application No. 13/189,216, filed on Jul. 22, 2011, which is a continuation-in-part of application No. 13/010,697, filed on Jan. 20, 2011, now Pat. No. 8,857,580, said application No. 13/189,216 is a continuation-in-part of application No. 13/175,244, filed on Jul. 1, 2011, now Pat. No. 8,627,932.

(60) Provisional application No. 61/709,041, filed on Oct. 2, 2012, provisional application No. 61/667,327, filed on Jul. 2, 2012, provisional application No. 61/491,858, filed on May 31, 2011, provisional application No. 61/645,465, filed on May 10, 2012, provisional application No. 61/143,152, filed on Jan. 7, 2009, provisional application No. 61/296,826, filed on Jan. 20, 2010, provisional application No. 61/361,127, filed on Jul. 2, 2010.

(51) Int. Cl.
    *B62K 25/08*     (2006.01)
    *F16F 9/32*     (2006.01)
    *F16F 9/46*     (2006.01)

(58) Field of Classification Search
    USPC .............. 188/269, 281, 282.3, 282.4, 285,
                   188/313–315, 322.13, 322.14; 280/276
    See application file for complete search history.

(56) References Cited

U.S. PATENT DOCUMENTS

| | | | |
|---|---|---|---|
| 1,655,786 | A | 1/1928 | Guerritore et al. |
| 1,923,011 | A | 8/1933 | Moulton |
| 1,948,600 | A | 2/1934 | Templeton |
| 2,018,312 | A | 10/1935 | Moulton |
| 2,259,437 | A | 10/1941 | Dean |
| 2,492,331 | A | 12/1949 | Spring |
| 2,540,525 | A | 2/1951 | Howarth et al. |
| 2,559,633 | A | 7/1951 | Maurice et al. |
| 2,697,600 | A | 12/1954 | Gregoire |
| 2,725,076 | A | 11/1955 | Hansen et al. |
| 2,729,308 | A | 1/1956 | Koski et al. |
| 2,784,962 | A | 3/1957 | Sherburne |
| 2,838,140 | A | 6/1958 | Rasmusson et al. |
| 2,846,028 | A | 8/1958 | Gunther |
| 2,879,971 | A | 3/1959 | Demay |
| 2,883,181 | A | 4/1959 | Hogan et al. |
| 2,897,613 | A | 8/1959 | Davidson et al. |
| 2,941,629 | A | 6/1960 | Etienne et al. |
| 2,991,804 | A | 7/1961 | Merkle |
| 3,003,595 | A | 10/1961 | Patriquin et al. |
| 3,056,598 | A | 10/1962 | Sutton et al. |
| 3,073,586 | A | 1/1963 | Hartel et al. |
| 3,085,530 | A | 4/1963 | Williamson |
| 3,087,583 | A | 4/1963 | Bruns |
| 3,202,413 | A | 8/1965 | Colmerauer |
| 3,206,153 | A | 9/1965 | Burke |
| 3,284,076 | A | 11/1966 | Gibson |
| 3,286,797 | A | 11/1966 | Leibfritz et al. |
| 3,405,625 | A | 10/1968 | Carlson et al. |
| 3,419,849 | A | 12/1968 | Anderson et al. |
| 3,420,493 | A | 1/1969 | Kraft et al. |
| 3,528,700 | A | 9/1970 | Janu et al. |
| 3,556,137 | A | 1/1971 | Billeter et al. |
| 3,559,027 | A | 1/1971 | Arsem |
| 3,575,442 | A | 4/1971 | Elliott et al. |
| 3,584,331 | A | 6/1971 | Richard et al. |
| 3,603,575 | A | 9/1971 | Arlasky et al. |
| 3,605,960 | A | 9/1971 | Singer |
| 3,701,544 | A | 10/1972 | Stankovich |
| 3,714,953 | A | 2/1973 | Solvang |
| 3,750,856 | A | 8/1973 | Kenworthy et al. |
| 3,784,228 | A | 1/1974 | Hoffmann et al. |
| 3,791,408 | A * | 2/1974 | Saitou .................. F16K 17/04 137/529 |
| 3,830,482 | A | 8/1974 | Norris |
| 3,842,753 | A | 10/1974 | Ross et al. |
| 3,861,487 | A | 1/1975 | Gill |
| 3,941,402 | A | 3/1976 | Yankowski et al. |
| 3,981,204 | A | 9/1976 | Starbard et al. |
| 3,986,118 | A | 10/1976 | Madigan et al. |
| 4,022,113 | A | 5/1977 | Blatt et al. |
| 4,032,829 | A | 6/1977 | Schenavar et al. |
| 4,036,335 | A | 7/1977 | Thompson et al. |
| 4,072,087 | A | 2/1978 | Mueller et al. |
| 4,103,881 | A | 8/1978 | Simich |
| 4,131,657 | A | 12/1978 | Ball et al. |
| 4,139,186 | A | 2/1979 | Postema et al. |
| 4,159,106 | A | 6/1979 | Nyman et al. |
| 4,174,098 | A | 11/1979 | Baker et al. |
| 4,183,509 | A | 1/1980 | Nishikawa et al. |
| 4,291,850 | A | 9/1981 | Sharples |
| 4,305,566 | A * | 12/1981 | Grawunde ............ F16K 31/406 137/491 |
| 4,333,668 | A | 6/1982 | Hendrickson et al. |
| 4,334,711 | A | 6/1982 | Mazur et al. |
| 4,337,850 | A | 7/1982 | Shimokura et al. |
| 4,348,016 | A | 9/1982 | Milly |
| 4,366,969 | A | 1/1983 | Benya et al. |
| 4,387,781 | A | 6/1983 | Ezell et al. |
| 4,437,548 | A | 3/1984 | Ashiba et al. |
| 4,474,363 | A | 10/1984 | Numazawa et al. |
| 4,491,207 | A | 1/1985 | Boonchanta et al. |
| 4,500,827 | A | 2/1985 | Merritt et al. |
| 4,502,673 | A | 3/1985 | Clark |
| 4,529,180 | A | 7/1985 | Hill |
| 4,548,233 | A * | 10/1985 | Wolfges .................. F16K 17/06 137/529 |
| 4,570,851 | A | 2/1986 | Cirillo et al. |
| 4,620,619 | A | 11/1986 | Emura et al. |
| 4,624,346 | A | 11/1986 | Katz |
| 4,634,142 | A | 1/1987 | Woods et al. |
| 4,655,440 | A | 4/1987 | Eckert |
| 4,659,104 | A | 4/1987 | Tanaka et al. |
| 4,660,689 | A | 4/1987 | Hayashi et al. |
| 4,673,194 | A | 6/1987 | Sugasawa |
| 4,709,779 | A | 12/1987 | Takehara |
| 4,729,459 | A | 3/1988 | Inagaki et al. |
| 4,732,244 | A | 3/1988 | Verkuylen |
| 4,744,444 | A | 5/1988 | Gillingham |
| 4,750,735 | A | 6/1988 | Furgerson et al. |
| 4,765,648 | A | 8/1988 | Mander et al. |
| 4,773,671 | A | 9/1988 | Inagaki |
| 4,786,034 | A | 11/1988 | Heess et al. |
| 4,815,575 | A | 3/1989 | Murty et al. |
| 4,821,852 | A | 4/1989 | Yokoya |
| 4,826,207 | A | 5/1989 | Yoshioka et al. |
| 4,830,395 | A | 5/1989 | Foley |
| 4,836,578 | A | 6/1989 | Soltis |
| 4,838,394 | A | 6/1989 | Lemme et al. |
| 4,846,317 | A | 7/1989 | Hudgens |
| 4,858,733 | A | 8/1989 | Noguchi et al. |
| 4,919,166 | A | 4/1990 | Sims et al. |
| 4,936,424 | A | 6/1990 | Costa |
| 4,949,262 | A | 8/1990 | Buma et al. |
| 4,949,989 | A | 8/1990 | Kakizaki et al. |
| 4,975,849 | A | 12/1990 | Ema et al. |
| 4,984,819 | A | 1/1991 | Kakizaki et al. |
| 5,027,303 | A | 6/1991 | Witte |
| 5,036,934 | A | 8/1991 | Nishina et al. |
| 5,040,381 | A | 8/1991 | Hazen |
| 5,044,614 | A | 9/1991 | Rau |
| 5,060,959 | A | 10/1991 | Davis et al. |
| 5,072,812 | A | 12/1991 | Imaizumi |
| 5,074,624 | A | 12/1991 | Stauble et al. |

(56) References Cited

U.S. PATENT DOCUMENTS

| | | | |
|---|---|---|---|
| 5,076,404 A | 12/1991 | Gustafsson | |
| 5,080,392 A | 1/1992 | Bazergui | |
| 5,094,325 A | 3/1992 | Smith | |
| 5,105,918 A | 4/1992 | Hagiwara et al. | |
| 5,113,980 A | 5/1992 | Furrer et al. | |
| 5,152,547 A | 10/1992 | Davis | |
| 5,161,653 A | 11/1992 | Hare, Sr. | |
| 5,163,742 A | 11/1992 | Topfer et al. | |
| 5,178,242 A | 1/1993 | Nakamura et al. | |
| 5,186,481 A | 2/1993 | Turner | |
| 5,203,584 A | 4/1993 | Butsuen et al. | |
| 5,207,774 A | 5/1993 | Wolfe et al. | |
| 5,230,364 A * | 7/1993 | Leng | F16K 17/06 137/514 |
| 5,236,169 A | 8/1993 | Johnsen et al. | |
| 5,248,014 A | 9/1993 | Ashiba | |
| 5,259,487 A | 11/1993 | Petek et al. | |
| 5,263,559 A | 11/1993 | Mettner | |
| 5,265,902 A | 11/1993 | Lewis | |
| 5,277,283 A | 1/1994 | Yamaoka et al. | |
| 5,284,330 A | 2/1994 | Carlson et al. | |
| 5,293,971 A | 3/1994 | Kanari | |
| 5,307,907 A | 5/1994 | Nakamura et al. | |
| 5,318,066 A * | 6/1994 | Burgdorf | B60T 8/365 251/83 |
| 5,347,186 A | 9/1994 | Konotchick et al. | |
| 5,348,112 A | 9/1994 | Vaillancourt | |
| 5,372,223 A | 12/1994 | DeKock et al. | |
| 5,372,224 A | 12/1994 | Samonil et al. | |
| 5,381,952 A | 1/1995 | Duprez | |
| 5,390,949 A | 2/1995 | Naganathan et al. | |
| 5,396,973 A | 3/1995 | Schwemmer et al. | |
| 5,398,787 A * | 3/1995 | Woessner | F16F 9/465 188/266.6 |
| 5,413,196 A * | 5/1995 | Forster | F16F 9/446 188/266.6 |
| 5,467,280 A | 11/1995 | Kimura | |
| 5,480,011 A | 1/1996 | Nagai et al. | |
| 5,487,006 A | 1/1996 | Kakizaki et al. | |
| 5,551,674 A | 9/1996 | Johnsen | |
| 5,553,836 A | 9/1996 | Ericson | |
| 5,578,877 A | 11/1996 | Tiemann | |
| 5,588,510 A | 12/1996 | Wilke | |
| 5,597,180 A * | 1/1997 | Ganzel | 280/124.106 |
| 5,598,337 A | 1/1997 | Butsuen et al. | |
| 5,601,164 A | 2/1997 | Ohsaki et al. | |
| 5,651,433 A * | 7/1997 | Wirth | F16F 9/325 188/266.6 |
| 5,657,840 A * | 8/1997 | Lizell | 188/266.5 |
| 5,687,575 A | 11/1997 | Keville et al. | |
| 5,699,885 A | 12/1997 | Foerster | |
| 5,722,645 A | 3/1998 | Reitter | |
| 5,803,443 A | 9/1998 | Chang | |
| 5,806,159 A | 9/1998 | Inoue et al. | |
| 5,810,128 A | 9/1998 | Eriksson et al. | |
| 5,813,456 A | 9/1998 | Milner et al. | |
| 5,813,731 A | 9/1998 | Newman et al. | |
| 5,818,132 A | 10/1998 | Konotchick et al. | |
| 5,826,935 A | 10/1998 | DeFreitas et al. | |
| 5,872,418 A | 2/1999 | Wischnewskiy | |
| 5,884,921 A | 3/1999 | Katsuda et al. | |
| 5,937,975 A * | 8/1999 | Forster | F16F 9/46 188/266.6 |
| 5,947,238 A | 9/1999 | Jolly et al. | |
| 5,952,823 A | 9/1999 | Sprecher et al. | |
| 5,954,318 A | 9/1999 | Kluhsman | |
| 5,956,951 A | 9/1999 | O'Callaghan | |
| 5,971,116 A | 10/1999 | Franklin | |
| 5,988,655 A | 11/1999 | Sakai et al. | |
| 5,992,450 A * | 11/1999 | Parker | F04B 49/24 137/491 |
| 5,996,745 A | 12/1999 | Jones et al. | |
| 5,996,746 A | 12/1999 | Turner et al. | |
| 5,999,868 A | 12/1999 | Beno et al. | |
| 6,000,702 A | 12/1999 | Streiter | |
| 6,017,047 A | 1/2000 | Hoose | |
| 6,035,979 A | 3/2000 | Foerster | |
| 6,058,340 A | 5/2000 | Uchiyama et al. | |
| 6,067,490 A | 5/2000 | Ichimaru et al. | |
| 6,073,536 A | 6/2000 | Campbell | |
| 6,073,700 A | 6/2000 | Tsuji et al. | |
| 6,073,736 A | 6/2000 | Franklin | |
| 6,092,011 A | 7/2000 | Hiramoto et al. | |
| 6,105,988 A | 8/2000 | Turner et al. | |
| 6,131,709 A | 10/2000 | Jolly et al. | |
| 6,135,434 A | 10/2000 | Marking | |
| 6,141,969 A | 11/2000 | Launchbury et al. | |
| 6,151,930 A | 11/2000 | Carlson | |
| 6,179,098 B1 | 1/2001 | Hayakawa et al. | |
| 6,199,669 B1 | 3/2001 | Huang et al. | |
| 6,213,263 B1 | 4/2001 | De Frenne | |
| 6,215,217 B1 | 4/2001 | Kurosawa et al. | |
| 6,217,049 B1 | 4/2001 | Becker | |
| 6,244,398 B1 | 6/2001 | Girvin et al. | |
| 6,254,067 B1 | 7/2001 | Yih | |
| 6,279,702 B1 | 8/2001 | Koh | |
| 6,293,530 B1 | 9/2001 | Delorenzis et al. | |
| 6,296,092 B1 | 10/2001 | Marking et al. | |
| 6,311,962 B1 | 11/2001 | Marking | |
| 6,318,525 B1 | 11/2001 | Vignocchi et al. | |
| 6,322,468 B1 | 11/2001 | Wing et al. | |
| 6,343,807 B1 | 2/2002 | Rathbun | |
| 6,360,857 B1 | 3/2002 | Fox et al. | |
| 6,371,262 B1 * | 4/2002 | Katou | F16F 9/465 188/266.5 |
| 6,371,267 B1 | 4/2002 | Kao et al. | |
| 6,378,885 B1 | 4/2002 | Ellsworth et al. | |
| 6,389,341 B1 | 5/2002 | Davis | |
| 6,390,747 B1 | 5/2002 | Commins | |
| 6,401,883 B1 | 6/2002 | Nyce et al. | |
| 6,415,895 B2 | 7/2002 | Marking et al. | |
| 6,418,360 B1 | 7/2002 | Spivey et al. | |
| 6,427,812 B2 | 8/2002 | Crawley et al. | |
| 6,434,460 B1 | 8/2002 | Uchino et al. | |
| 6,446,771 B1 | 9/2002 | Sintorn et al. | |
| 6,467,593 B1 | 10/2002 | Corradini et al. | |
| 6,474,454 B2 | 11/2002 | Matsumoto et al. | |
| 6,474,753 B1 | 11/2002 | Rieth et al. | |
| 6,501,554 B1 | 12/2002 | Hackney et al. | |
| 6,502,837 B1 | 1/2003 | Hamilton et al. | |
| 6,510,929 B1 | 1/2003 | Gordaninejad et al. | |
| 6,520,297 B1 | 2/2003 | Lumpkin et al. | |
| 6,592,136 B2 | 7/2003 | Becker et al. | |
| 6,619,615 B1 * | 9/2003 | Mayr | H01F 7/13 251/129.02 |
| 6,648,109 B2 | 11/2003 | Farr et al. | |
| 6,659,240 B2 | 12/2003 | Dernebo | |
| 6,672,687 B2 | 1/2004 | Nishio | |
| 6,732,033 B2 | 5/2004 | LaPlante et al. | |
| 6,782,980 B2 | 8/2004 | Nakadate | |
| 6,817,454 B2 | 11/2004 | Nezu et al. | |
| 6,840,257 B2 | 1/2005 | Dario et al. | |
| 6,857,625 B2 | 2/2005 | Löser et al. | |
| 6,863,291 B2 | 3/2005 | Miyoshi | |
| 6,905,203 B2 | 6/2005 | Kremers et al. | |
| 6,920,951 B2 | 7/2005 | Song et al. | |
| 6,923,853 B2 | 8/2005 | Kremers et al. | |
| 6,935,157 B2 | 8/2005 | Miller | |
| 6,952,060 B2 | 10/2005 | Goldner et al. | |
| 6,959,906 B2 | 11/2005 | Hoenig et al. | |
| 6,959,921 B2 | 11/2005 | Rose | |
| 6,966,412 B2 | 11/2005 | Braswell et al. | |
| 6,978,871 B2 | 12/2005 | Holiviers | |
| 6,978,872 B2 | 12/2005 | Turner | |
| 6,991,076 B2 | 1/2006 | McAndrews | |
| 7,025,367 B2 | 4/2006 | McKinnon et al. | |
| 7,076,351 B2 | 7/2006 | Hamilton et al. | |
| 7,128,192 B2 | 10/2006 | Fox | |
| 7,135,794 B2 | 11/2006 | Kühnel | |
| 7,147,207 B2 | 12/2006 | Jordan et al. | |
| 7,163,222 B2 | 1/2007 | Becker et al. | |
| 7,208,845 B2 | 4/2007 | Schaefer et al. | |
| 7,234,575 B2 | 6/2007 | Anderfaas et al. | |

(56) References Cited

U.S. PATENT DOCUMENTS

| | | |
|---|---|---|
| 7,234,680 B2 | 6/2007 | Hull et al. |
| 7,243,763 B2 | 7/2007 | Carlson |
| 7,270,221 B2 | 9/2007 | McAndrews |
| 7,287,760 B1 | 10/2007 | Quick et al. |
| 7,293,764 B2 | 11/2007 | Fang |
| 7,299,112 B2 | 11/2007 | LaPlante et al. |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,063 B1 | 8/2008 | Davis |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,523,617 B2 | 4/2009 | Colpitts et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 * | 6/2010 | Kleinert ............... H01F 7/1607 137/625.26 |
| 7,770,701 B1 | 8/2010 | Davis |
| 7,779,974 B2 | 8/2010 | Timoney et al. |
| 7,795,711 B2 | 9/2010 | Sauciuc et al. |
| 7,837,213 B2 | 11/2010 | Colegrove et al. |
| 7,857,325 B2 | 12/2010 | Copsey et al. |
| 7,872,764 B2 | 1/2011 | Higgins-Luthman et al. |
| 7,909,348 B2 | 3/2011 | Klieber et al. |
| 7,931,132 B2 | 4/2011 | Braun |
| 7,946,163 B2 | 5/2011 | Gartner |
| 8,016,349 B2 | 9/2011 | Mouri et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,127,900 B2 | 3/2012 | Inoue |
| 8,136,877 B2 | 3/2012 | Walsh et al. |
| 8,151,952 B2 | 4/2012 | Lenz et al. |
| 8,191,964 B2 | 6/2012 | Hsu et al. |
| 8,210,106 B2 | 7/2012 | Tai et al. |
| 8,210,330 B2 | 7/2012 | Vandewal |
| 8,256,587 B2 | 9/2012 | Bakke et al. |
| 8,262,062 B2 | 9/2012 | Kamo et al. |
| 8,262,100 B2 | 9/2012 | Thomas |
| 8,285,447 B2 | 10/2012 | Bennett et al. |
| 8,286,982 B2 | 10/2012 | Plantet et al. |
| 8,291,889 B2 * | 10/2012 | Shafer ................ F02M 63/025 123/458 |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,336,683 B2 | 12/2012 | McAndrews et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,458,080 B2 | 6/2013 | Shirai |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,622,180 B2 | 1/2014 | Wootten et al. |
| 8,627,932 B2 | 1/2014 | Marking |
| 8,641,073 B2 | 2/2014 | Lee et al. |
| 8,655,548 B2 | 2/2014 | Ichida et al. |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,857,580 B2 | 10/2014 | Marking |
| 8,888,115 B2 | 11/2014 | Chubbuck et al. |
| 8,936,139 B2 | 1/2015 | Franklin et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,991,571 B2 | 3/2015 | Murakami |
| 9,033,122 B2 | 5/2015 | Ericksen et al. |
| 9,038,791 B2 | 5/2015 | Marking |
| 9,073,592 B2 | 7/2015 | Hsu |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,194,456 B2 | 11/2015 | Laird et al. |
| 9,199,690 B2 | 12/2015 | Watarai |
| 9,239,090 B2 | 1/2016 | Marking et al. |
| 9,278,598 B2 | 3/2016 | Galasso et al. |
| 9,353,818 B2 | 5/2016 | Marking |
| 9,366,307 B2 | 6/2016 | Marking |
| 9,422,018 B2 | 8/2016 | Pelot et al. |
| 9,452,654 B2 | 9/2016 | Ericksen |
| 9,550,405 B2 | 1/2017 | Marking et al. |
| 9,556,925 B2 | 1/2017 | Marking |
| 9,616,728 B2 | 4/2017 | Marking |
| 9,663,181 B2 | 5/2017 | Ericksen et al. |
| 9,682,604 B2 | 6/2017 | Cox et al. |
| 9,784,333 B2 | 10/2017 | Marking |
| 2001/0017334 A1 | 8/2001 | Vincent |
| 2001/0042663 A1 | 11/2001 | Marking et al. |
| 2002/0000352 A1 | 1/2002 | Matsumoto et al. |
| 2002/0032508 A1 | 3/2002 | Uchino et al. |
| 2002/0050518 A1 | 5/2002 | Roustaei |
| 2002/0063469 A1 | 5/2002 | Nishio |
| 2002/0089107 A1 | 7/2002 | Koh |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0051954 A1 | 3/2003 | Sendrea |
| 2003/0065430 A1 | 4/2003 | Lu et al. |
| 2003/0075403 A1 | 4/2003 | Dernebo |
| 2003/0103651 A1 | 6/2003 | Novak |
| 2003/0160369 A1 | 8/2003 | LaPlante et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0099312 A1 * | 5/2004 | Boyer ..................... 137/489.5 |
| 2004/0208687 A1 | 10/2004 | Sicz et al. |
| 2004/0222056 A1 | 11/2004 | Fox |
| 2004/0256778 A1 | 12/2004 | Verriet |
| 2005/0077131 A1 | 4/2005 | Russell |
| 2005/0098401 A1 | 5/2005 | Hamilton et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0199455 A1 | 9/2005 | Browne et al. |
| 2006/0064223 A1 | 3/2006 | Voss |
| 2006/0065496 A1 | 3/2006 | Fox |
| 2006/0066074 A1 | 3/2006 | Turner et al. |
| 2006/0081431 A1 | 4/2006 | Breese et al. |

(56) References Cited

U.S. PATENT DOCUMENTS

| | | |
|---|---|---|
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0237272 A1* | 10/2006 | Huang .................. B62K 25/04 188/299.1 |
| 2006/0289258 A1 | 12/2006 | Fox |
| 2007/0007743 A1 | 1/2007 | Becker et al. |
| 2007/0008096 A1 | 1/2007 | Tracy |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2008/0006494 A1 | 1/2008 | Vandewal |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0099968 A1 | 5/2008 | Schroeder |
| 2008/0116622 A1 | 5/2008 | Fox |
| 2008/0185244 A1 | 8/2008 | Maeda et al. |
| 2008/0250844 A1 | 10/2008 | Gartner |
| 2008/0303320 A1 | 12/2008 | Schranz et al. |
| 2008/0314706 A1 | 12/2008 | Lun et al. |
| 2009/0001684 A1 | 1/2009 | McAndrews et al. |
| 2009/0020382 A1* | 1/2009 | Van Weelden .......... F16F 9/465 188/282.2 |
| 2009/0038897 A1 | 2/2009 | Murakami |
| 2009/0071773 A1 | 3/2009 | Lun |
| 2009/0121398 A1 | 5/2009 | Inoue |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0261542 A1 | 10/2009 | McIntyre |
| 2009/0277736 A1 | 11/2009 | McAndrews et al. |
| 2009/0288924 A1* | 11/2009 | Murray .................. F16F 9/466 188/322.13 |
| 2009/0294231 A1 | 12/2009 | Carlson et al. |
| 2009/0302558 A1 | 12/2009 | Shirai |
| 2009/0324327 A1 | 12/2009 | McAndrews et al. |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0170760 A1 | 7/2010 | Marking |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0018263 A1 | 1/2012 | Marking |
| 2012/0018264 A1 | 1/2012 | King |
| 2012/0048665 A1 | 3/2012 | Marking |
| 2012/0080279 A1 | 4/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0081171 A1 | 3/2015 | Ericksen et al. |
| 2015/0197308 A1 | 7/2015 | Butora et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0259876 A1 | 9/2017 | Ericksen et al. |
| 2017/0291466 A1 | 10/2017 | Tong |
| 2018/0010666 A1 | 1/2018 | Marking |
| 2018/0031071 A1 | 2/2018 | Marking |

FOREIGN PATENT DOCUMENTS

| | | |
|---|---|---|
| DE | 3711442 A1 | 10/1988 |
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 202010012738 U1 | 12/2010 |
| EP | 207409 A2 | 1/1987 |
| EP | 0304801 A2 | 3/1989 |
| EP | 304801 A2 | 3/1989 |
| EP | 1050696 A2 | 11/2000 |
| EP | 1241087 A1 | 9/2002 |
| EP | 1355209 A1 | 10/2003 |
| EP | 1623856 A2 | 2/2006 |
| EP | 1757473 A2 | 2/2007 |
| EP | 2103512 A2 | 9/2009 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| FR | 2617928 A1 | 1/1989 |
| GB | 2104183 A | 3/1983 |
| GB | 2159604 A | 12/1985 |
| GB | 2180320 A | 3/1987 |
| GB | 2289111 A | 11/1995 |
| JP | 57173632 A | 10/1982 |
| JP | 57173632 U | 11/1982 |

(56) References Cited

FOREIGN PATENT DOCUMENTS

| JP | 57182506 A | 11/1982 |
|---|---|---|
| JP | 01106721 A | 4/1989 |
| JP | H0193637 A | 4/1989 |
| JP | H02168038 A | 6/1990 |
| JP | H03113139 A | 5/1991 |
| JP | 34203540 A | 7/1992 |
| JP | 35149364 A | 6/1993 |
| JP | 06101735 A | 4/1994 |
| JP | 06185562 A | 7/1994 |
| JP | H084818 A | 1/1996 |
| JP | 2007302211 A | 11/2007 |
| KR | 20070076226 A | 7/2007 |
| WO | 98/40231 | 9/1998 |
| WO | 9840231 A2 | 9/1998 |
| WO | 99/06231 | 2/1999 |
| WO | 0027658 A1 | 5/2000 |
| WO | 2008086605 A1 | 7/2008 |

OTHER PUBLICATIONS

EP Search Report for European Application No. 15163428.4, dated Jul. 3, 2017, 7 Pages.
European Search Report and Written Opinion, European Patent Application No. 13165362.8, dated Sep. 24, 2014, 6 Pages.
European Search Report, European Patent Application No. 14189773.6, dated May 4, 2015, 4 Pages.
European Patent Office Final Decision dated Mar. 21, 2013, European Patent Application No. 10161906.2.
Nilsson, "Opposition Letter Against EP-2357098", Oct. 13, 2017, 7 pages.
"European Search Report for European Application No. 10187320, 2 pages, Sep. 25, 2017 (Sep. 25, 2017)".
"European Search Report for European Application No. 11153607, 3 pages, Aug. 10, 2012 (Aug. 10, 2012))".
"European Search Report for European Application No. 12184150, 10 pages, Dec. 12, 2017 (Dec. 12, 2017)".
"European Search Report for European Application No. 13174817. 0, 13 pages, Jan. 8, 2018 (Jan. 8, 2018))".
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop"in Engineer to win—Chapter 13: Springs and Shock Absorbers", MBI Publishing Company and Motorbooks, USA XP055430818, ISBN: 978-0-87938-186-8, Dec. 31, 1984, 207.
"European Search Report for European Application No. 11172553, 2 pages, Sep. 25, 2017 (Sep. 25, 2017)".
"European Search Report for European Application No. 11175126, 2 pages, Sep. 25, 2017 (Sep. 25, 2017)".
"European Search Report for European Application No. 12170370 , 2 pages, Nov. 15, 2017 (Nov. 15, 2017)".
"European Search Report for European Application No. 17188022, 9 pages, Feb. 1, 2018, (Feb. 1, 2018))".
Fachkunde Fahrradtechnik 4 Auflage, Gressmann_Inhaltv und S, 2011, 206-207.
Statement of Grounds of Appeal, EP App. No. 11153607.4, dated May 28, 2018, 88 Pages.
Grounds of Appeal, EP App. No. 11153607.4, dated Jun. 1, 2018, 28 Pages.
Puhn, "How To Make Your Car Handle", HPBooks, 1981, 7 Pages.

* cited by examiner

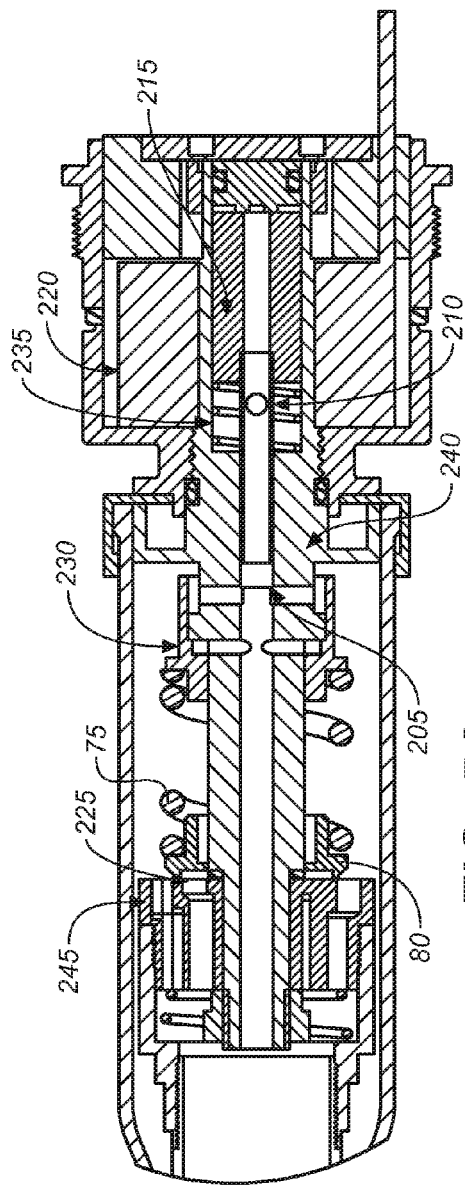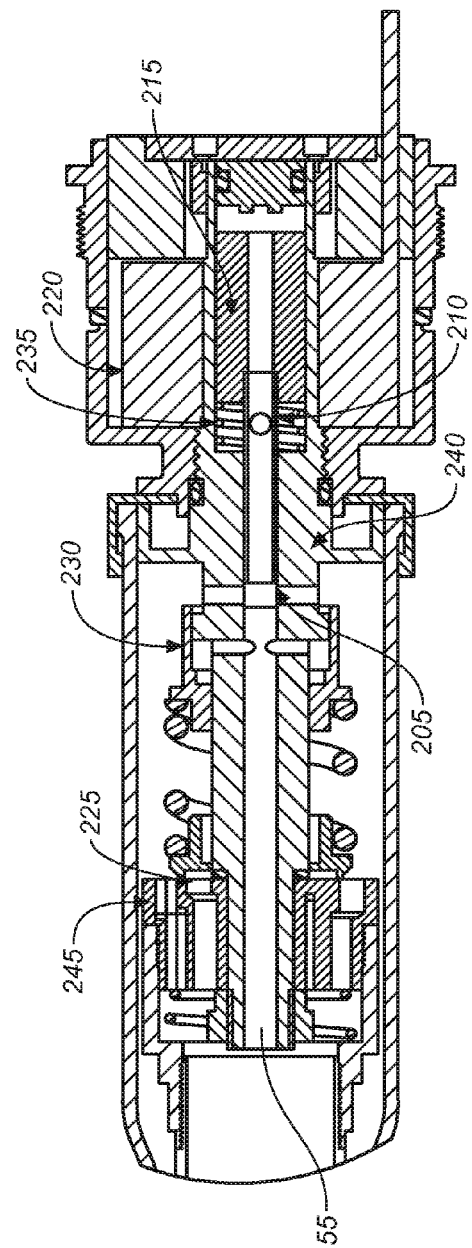
FIG. 5A
FIG. 5B

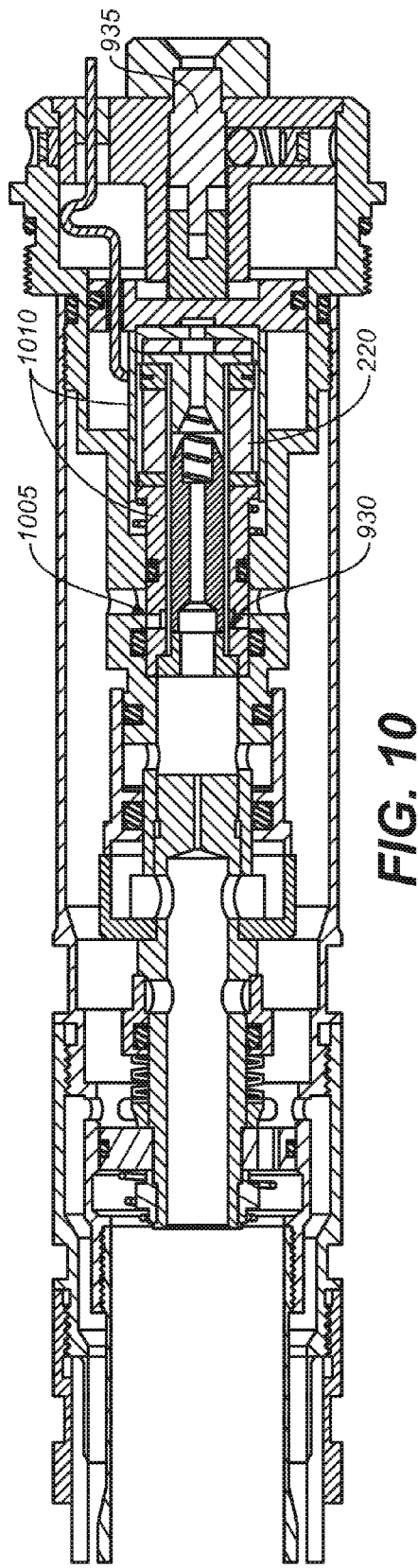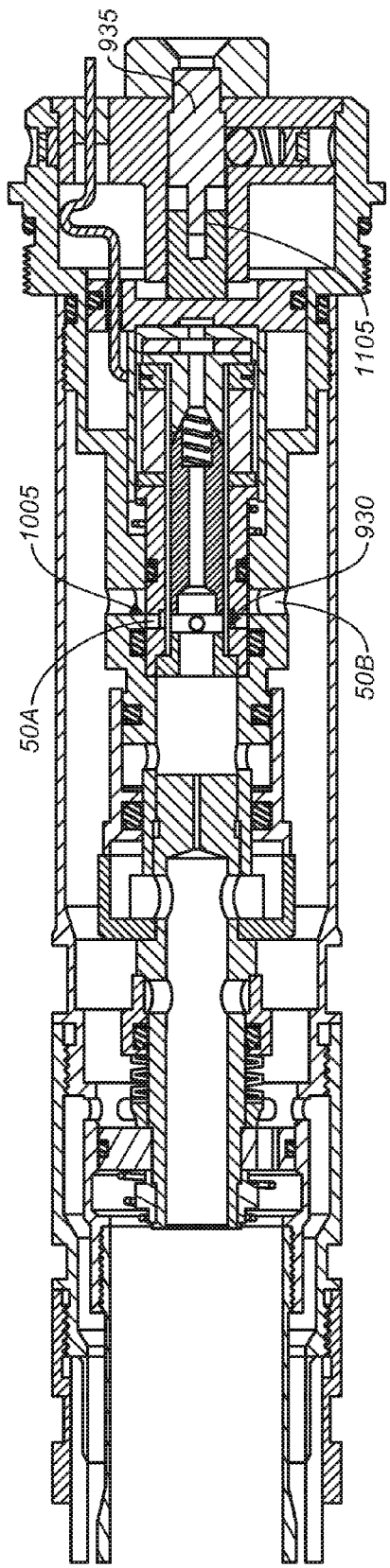

METHOD AND APPARATUS FOR AN ADJUSTABLE DAMPER

CROSS-REFERENCE TO RELATED APPLICATIONS

This application is a continuation-in-part application of and claims the benefit of co-pending U.S. patent application Ser. No. 13/843,704, filed on Mar. 15, 2013, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/843,704, claims the benefit of and claims priority of U.S. provisional patent application Ser. No. 61/709,041, filed on Oct. 2, 2012, entitled "METHOD AND APPARATUS FOR AN ADJUSTABLE DAMPER" by Ericksen et al., assigned to the assignee of the present application, and is hereby incorporated by reference in its entirety herein.

This application claims the benefit of and claims priority of U.S. provisional patent application Ser. No. 61/667,327, filed on Jul. 2, 2012, entitled "METHOD AND APPARATUS FOR AN ADJUSTABLE DAMPER" by Ericksen et al., assigned to the assignee of the present application, and is hereby incorporated by reference in its entirety herein.

This application is a continuation-in-part application of and claims the benefit of co-pending U.S. patent application Ser. No. 13/485,401, filed on May 31, 2012, entitled "METHODS AND APPARATUS FOR POSITION SENSITIVE SUSPENSION DAMPING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/491,858, filed on May 31, 2011, entitled "METHODS AND APPARATUS FOR POSITION SENSITIVE SUSPENSION DAMPENING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

This application is a continuation-in-part application of and claims the benefit of co-pending U.S. patent application Ser. No. 12/684,072, filed on Jan. 7, 2010, entitled "REMOTELY OPERATED BYPASS FOR A SUSPENSION DAMPER" by John Marking, assigned to the assignee of the present application, and is hereby incorporated by reference in its entirety herein.

The application with Ser. No. 12/684,072 claims the benefit of and claims priority of U.S. provisional patent application Ser. No. 61/143,152, filed on Jan. 7, 2009, entitled "REMOTE BYPASS LOCK-OUT" by John Marking, assigned to the assignee of the present application, and is hereby incorporated by reference in its entirety herein.

This application is a continuation-in-part application of and claims the benefit of co-pending U.S. patent application Ser. No. 13/189,216, filed on Jul. 22, 2011, entitled "SUSPENSION DAMPER WITH REMOTELY-OPERABLE VALVE" by John Marking, assigned to the assignee of the present application, and is hereby incorporated by reference in its entirety herein.

The application with Ser. No. 13/189,216 is a continuation-in-part application of and claims the benefit of co-pending U.S. patent application Ser. No. 13/010,697, filed on Jan. 20, 2011, entitled "REMOTELY OPERATED BYPASS FOR A SUSPENSION DAMPER" by John Marking, assigned to the assignee of the present application, and is hereby incorporated by reference in its entirety herein.

The application with Ser. No. 13/010,697 claims the benefit of and claims priority of U.S. provisional patent application Ser. No. 61/296,826, filed on Jan. 20, 2010, entitled "BYPASS LOCK-OUT VALVE FOR A SUSPENSION DAMPER" by John Marking, assigned to the assignee of the present application, and is hereby incorporated by reference in its entirety herein.

The application with Ser. No. 13/189,216 is a continuation-in-part application of and claims the benefit of co-pending U.S. patent application Ser. No. 13/175,244, filed on Jul. 1, 2011, entitled "BYPASS FOR A SUSPENSION DAMPER" by John Marking, assigned to the assignee of the present application, and is hereby incorporated by reference in its entirety herein.

The application with Ser. No. 13/175,244 claims the benefit of and claims priority of U.S. provisional patent application Ser. No. 61/361,127, filed on Jul. 2, 2010, entitled "BYPASS LOCK-OUT VALVE FOR A SUSPENSION DAMPER" by John Marking, assigned to the assignee of the present application, and is hereby incorporated by reference in its entirety herein.

BACKGROUND

Field of the Invention

Embodiments generally relate to a damper assembly for a vehicle. More specifically, the invention relates to an adjustable damper for use with a vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

SUMMARY OF EMBODIMENTS

According to aspects of embodiments, there is provided a vehicle suspension damper including:
a damping chamber containing a damping fluid, and a piston and a piston rod moveable in the damping cylinder;

a valve for controlling movement of said damping fluid in compression and/or rebound of said vehicle suspension damper, the valve having:

a primary valve member for resisting damping fluid flow along a first fluid flow path from a first side of the valve to a second side of the valve;

a first pressure reducing means and a second pressure reducing means in a second fluid flow path between said first and second sides of the valve;

wherein a surface of the primary valve member is exposed to damping fluid in said second fluid flow path between said first and second pressure reducing means;

the arrangement being such that, in use, during compression and/or rebound of said vehicle suspension damper damping fluid is urged to flow through said first fluid flow path at a first fluid pressure resisted by said primary valve member, and at the same time pressure of damping fluid in the second fluid flow path is reduced by the first and second pressure reducing means to a second fluid pressure lower than said first fluid pressure; and the second fluid pressure acts on a said surface of said primary valve member so that the primary valve member increases its resistance to damping fluid flow along said first fluid flow path.

In one embodiment, the first fluid flow path includes a first area over which said first fluid pressure acts to urge said primary valve member open, and said surface of said primary valve member includes a second area over which said second fluid pressure acts to urge said primary valve member closed, and wherein a ratio of said first area to said second area determines how much resistance is provided by said primary valve member and thereby the damping characteristics of said vehicle suspension damper.

In one embodiment, the second area is smaller than said first area, for example said second area is about 60% or less of said first area.

In one embodiment, an exterior surface of said primary valve member is exposed to damping fluid on said second side of said valve, and an interior surface of said primary valve member is exposed to damping fluid in said second fluid flow path, which interior surface includes said surface.

In one embodiment, the first pressure reducing means provides (i) a bleed for damping fluid at low compression or rebound velocities, and (ii) at higher compression or rebound velocities a reduction in damping fluid pressure that is directly proportional to the velocity of the damping fluid through the first pressure reducing means, whereby hydraulic locking of said primary valve member is inhibited; and/or wherein said first pressure reducing means includes at least one of an orifice, a diffuser, a labyrinth, and a screw thread.

In one embodiment, the second pressure reducing means is adjustable, for example manually adjustable by a user and/or automatically adjustable by a computing device, whereby, in use, adjustment of said second pressure reducing means effects a corresponding adjustment of said second fluid pressure, and thereby a corresponding change in the resistance by said primary valve member to damping fluid flow along said first fluid flow path.

In one embodiment, the second pressure reducing means includes a pilot valve controllable by an electro-mechanical device.

In one embodiment, the second pressure reducing means includes at least one of a spool valve controlled by a magnetic latching solenoid, a needle positionable relative to a seat, a vane valve, a solenoid valve, and moveable screw.

In one embodiment, the primary valve member acts directly against said first fluid pressure, the arrangement being such that, in use, when said second pressure reducing means is adjusted to reduce said second fluid pressure, said primary valve member is moved by said first fluid pressure to increase damping fluid flow through said first fluid flow path.

In one embodiment, the first pressure reducing means is adapted to produce turbulent flow of damping fluid downstream thereof; and/or further comprising a diffuser in said second fluid flow path between said first and second pressure reducing means wherein, in use, said diffuser disrupts substantially linear damping fluid flow, such as a jet, in said second fluid flow path; and optionally wherein said diffuser is arranged to, in use, cause a change in velocity of said substantially linear fluid flow, for example a change in direction; and optionally wherein said diffuser includes a pin having a longitudinal axis oriented substantially perpendicularly to said linear damping fluid flow; and optionally wherein said diffuser includes at least one fluid flow port, such as a plug having at least one such fluid flow port, that forces a change in direction of said substantially linear fluid flow.

In one embodiment, the primary valve member includes an annular piston axially moveable along a valve body; and optionally wherein said valve body comprises a fluid port providing fluid communication between a valve body interior and an annular piston interior.

In one embodiment, the valve body includes said first and second pressure reducing means, and said valve body interior comprises a pilot pressure chamber that is hydraulically between said first and second pressure reducing means and that is in fluid communication with said annular piston interior via said fluid port.

In one embodiment, the first fluid flow path includes one or more shim for controlling flow of damping fluid along said first fluid flow path, and said primary valve member is arranged apply a variable force to said one or more shim, the arrangement being such that, in use, the resistance to damping fluid flow along said first fluid path is the sum of the resistance provided by said shims and by said primary valve member.

In one embodiment, the valve assembly includes: a valve for controlling movement of a damping fluid in compression and/or rebound of said vehicle suspension damper, the valve having: a primary valve member for resisting damping fluid flow along a first fluid flow path from a first side of the valve to a second side of the valve; a first pressure reducing means and a second pressure reducing means in a second fluid flow path between said first and second sides of the valve; wherein a surface of the primary valve member is exposed to damping fluid in said second fluid flow path between said first and second pressure reducing means; the arrangement being such that, in use, during compression and/or rebound of said vehicle suspension damper damping fluid is urged to flow through said first fluid flow path at a first fluid pressure resisted by said primary valve member, and at the same time pressure of damping fluid in the second fluid flow path is reduced by the first and second pressure reducing means to a second fluid pressure lower than said first fluid pressure; and the second fluid pressure acts on a said surface of said primary valve member so that the primary valve member increases its resistance to damping fluid flow along said first fluid flow path.

In one embodiment, a vehicle includes a vehicle suspension damper as described above.

According to certain embodiments, there is provided a vehicle suspension damper including:

a damping chamber containing a damping fluid, and a piston and a piston rod moveable in the damping cylinder;

a valve for controlling movement of said damping fluid in compression and/or rebound of said vehicle suspension damper, the valve having:

a primary valve member for resisting damping fluid flow along a first fluid flow path from a first side of the valve to a second side of the valve;

a first pressure reducing means and a second pressure reducing means in a second fluid flow path between said first and second sides of the valve;

wherein a surface of the primary valve member is exposed to damping fluid in said second fluid flow path between said first and second pressure reducing means;

the arrangement being such that, in use, during compression and/or rebound of said vehicle suspension damper damping fluid is urged to flow through said first fluid flow path at a first fluid pressure resisted by said primary valve member, and at the same time pressure of damping fluid in the second fluid flow path is reduced by the first and second pressure reducing means to a second fluid pressure lower than said first fluid pressure; and the second fluid pressure acts on a said surface of said primary valve member whereby so that the primary valve member increases its resistance to damping fluid flow along said first fluid flow path.

The surface of the primary valve member may be a force-generating surface. In particular, the surface may be oriented so that, when said second fluid pressure acts against the surface, a resultant force is generated on the primary valve member tending to offer increased resistance to fluid flow through the first fluid flow path. In certain embodiments the force-generating surface includes an area that is substantially perpendicular to the direction of the resultant force.

In certain aspects the valve further includes a reaction surface that remains stationary relative to the force-generating surface under application of said second fluid pressure. For example, the reaction surface may be part of a valve body relative to which the primary valve member is movable by said second fluid pressure.

In some aspects, the valve is positioned in the vehicle suspension damper to receive damping fluid directly from a damping cylinder, whereby the first and second pressures are each a function of damping fluid pressure in the damping cylinder.

In one embodiment, said first fluid flow path includes a first area over which said first fluid pressure acts to urge said primary valve member open, and said surface of said primary valve member includes a second area over which said second fluid pressure acts to urge said primary valve member closed, and wherein a ratio of said first area to said second area determines how much resistance is provided by said primary valve member and thereby the damping characteristics of said vehicle suspension damper. In one embodiment said second area is smaller than said first area, for example said second area is about 60% or less of said first area. By adjusting the ratio of these two areas the designer and/or manufacture can determine inter alia the maximum force that the primary valve member can exert against a fluid port or a valve shim for example. In some embodiments, as the second area gets smaller in comparison to the first area (or the first area gets bigger in comparison to the second area), the maximum force decreases. In that way it is possible to determine whether the valve member provides a 'lock-out' function on the damper, or whether the valve member can only restrict damping fluid flow at maximum force, but not stop it completely.

In one embodiment, an exterior surface of said primary valve member is exposed to damping fluid on said second side of said valve, and an interior surface of said primary valve member is exposed to damping fluid in said second fluid flow path, which interior surface includes said surface. Since the surface is inside the primary valve member and between two pressure reducing means, the force provided by the primary valve member is not dependent on the temperature of the damping fluid or on the position of the piston and piston rod in the main damping cylinder.

In one embodiment, said first pressure reducing means provides (i) a bleed for damping fluid at low compression or rebound velocities, and (ii) at higher compression or rebound velocities a reduction in damping fluid pressure that is directly proportional to the velocity of the damping fluid through the first pressure reducing means, whereby hydraulic locking of said primary valve member is inhibited.

In certain aspects said first pressure reducing means includes at least one of an orifice (for example a bore or channel), a diffuser, a labyrinth, and a screw thread. In some embodiments the orifice is smaller in diameter than an inlet channel to the valve.

In one embodiment, said second pressure reducing means is adjustable, for example manually adjustable by a user and/or automatically adjustable by a computing device, whereby, in use, adjustment of said second pressure reducing means effects a corresponding adjustment of said second fluid pressure, and thereby a corresponding change in the resistance by said primary valve member to damping fluid flow along said first fluid flow path. For example a user of the vehicle may adjust the second pressure reducing means directly on the damper, or remotely from the damper, possibly via an intermediate electronic controller. Additionally or alternatively, adjustment of the second pressure reducing means is performed by an electronic computing device. The computing device may be connected to one or more vehicle motion sensor, and may receive an input from the one or more vehicle motion sensor. The computing device may use the input to determine an adjustment for the second pressure reducing means that could increase or decrease damping force provided by the damper. Such an embodiment may be called an 'electronic valve'. In other words, the function of controlling damping according to inertia is performed by the combination of a sensor, an electronic controller and the valve described above. This arrangement permits much faster control of the valve than known inertia valves that rely on movement of a mass to effect valve control.

Adjustability of the second pressure reducing means enables the damping fluid pressure with the second fluid flow path to be adjusted, and thereby the force applied by the primary valve member to be adjusted also. Whilst the aforementioned area ratio controls the overall damping characteristics of the valve, adjustment of the second pressure reducing means controls the particular damping characteristics of the valve at any point in time, but within the limits set by the area ratio.

In other embodiments, the second pressure reducing means is provided with a fine tuning mechanism that allows a user to fine tune the damping characteristics of the valve. In some aspects the fine tuning mechanism is an adjuster that moves a metering edge to increase the partial block provided by the second pressure reducing means to damping fluid flow.

In one embodiment, said primary valve member acts directly against said first fluid pressure, the arrangement being such that, in use, when said second pressure reducing means is adjusted to reduce said second fluid pressure, said primary valve member is moved by said first fluid pressure to increase damping fluid flow through said first fluid flow path. In this way, very rapid changes damping characteristics can be achieved. For example, in certain embodiments a switch between 'full firm' and 'full soft' damping characteristics can be achieved in less than 10 ms, and sometimes less than 5 ms.

In certain aspects, said second pressure reducing means includes a pilot valve controllable by an electro-mechanical device. For example, the said second pressure reducing means may be at least one of a spool valve controlled by a magnetic latching solenoid, a needle positionable relative to a seat, a vane valve, a solenoid valve, and moveable screw.

In some situations when the first pressure reducing means is a an orifice and the second pressure reducing means is a pilot valve it has been found that, at high compression velocities, the pilot valve can close of its own accord. This is undesirable because the second fluid pressure increases, which causes the primary valve member to offer increased resistance to fluid flow, and may be even lock out depending on the set up. It has been found that this is due to a jet effect caused on the damping fluid by the orifice. Accordingly this problem may not be limited to the two specific kinds of first and second pressure reducing means mentioned. In order to solve this problem, a device for disrupting damping fluid flow in the second fluid flow path is incorporated in certain embodiments. Such a device may be separate from the first and second pressure reducing means, or may be incorporated into one or both of them. In other embodiments the first pressure reducing means may be of a kind the naturally produces turbulent flow rather than linear flow in the second fluid flow path. Preferably, the vehicle suspension damper further includes a diffuser in said second fluid flow path between said first and second pressure reducing means wherein, in use, said diffuser disrupts substantially linear damping fluid flow, such as a jet, in said second fluid flow path.

In one embodiment, said diffuser is arranged to, in use, cause a change in velocity of said substantially linear fluid flow, for example a change in direction.

In one embodiment, said diffuser includes a pin having a longitudinal axis oriented substantially perpendicularly to said linear damping fluid flow.

In one embodiment, said diffuser includes at least one fluid flow port, such as a plug having at least one such fluid flow port, that forces a change in direction of said substantially linear fluid flow.

In some embodiments said primary valve member includes an annular piston axially moveable along a valve body.

In one embodiment, said valve body includes a fluid port providing fluid communication between a valve body interior and an annular piston interior.

Preferably, said valve body includes said first and second pressure reducing means, and said valve body interior includes a pilot pressure chamber that is hydraulically between said first and second pressure reducing means and that is in fluid communication with said annular piston interior via said fluid port.

In one embodiment, said first fluid flow path includes one or more shim for controlling flow of damping fluid along said first fluid flow path, and said primary valve member is arranged apply a variable force to said one or more shim, the arrangement being such that, in use, the resistance to damping fluid flow along said first fluid path is the sum of the resistance provided by said shims and by said primary valve member.

According to other aspects there is provided a valve assembly for use in a vehicle suspension damper, which valve assembly includes:

a valve for controlling movement of a damping fluid in compression and/or rebound of said vehicle suspension damper, the valve having:

a primary valve member for resisting damping fluid flow along a first fluid flow path from a first side of the valve to a second side of the valve;

a first pressure reducing means and a second pressure reducing means in a second fluid flow path between said first and second sides of the valve;

wherein a surface of the primary valve member is exposed to damping fluid in said second fluid flow path between said first and second pressure reducing means;

the arrangement being such that, in use, during compression and/or rebound of said vehicle suspension damper damping fluid is urged to flow through said first fluid flow path at a first fluid pressure resisted by said primary valve member, and at the same time pressure of damping fluid in the second fluid flow path is reduced by the first and second pressure reducing means to a second fluid pressure lower than said first fluid pressure; and the second fluid pressure acts on a said surface of said primary valve member so that the primary valve member increases its resistance to damping fluid flow along said first fluid flow path.

It is foreseeable that the valve assembly might be manufactured and sold separately from a vehicle suspension assembly.

According to yet other aspects there is provided a vehicle comprising a vehicle suspension damper as set out above.

BRIEF DESCRIPTION OF THE DRAWINGS

FIG. 5A and FIG. 5B depict a cross-sectional side elevation view of a valve assembly of detail 2 of the shock absorber of FIG. 1B, in accordance with an embodiment.

FIGS. 9-13 depict a cross-sectional side elevation view of the base valve assembly of detail 2 of FIG. 1B, including a "latching solenoid", in accordance with an embodiment.

Figure 1A:
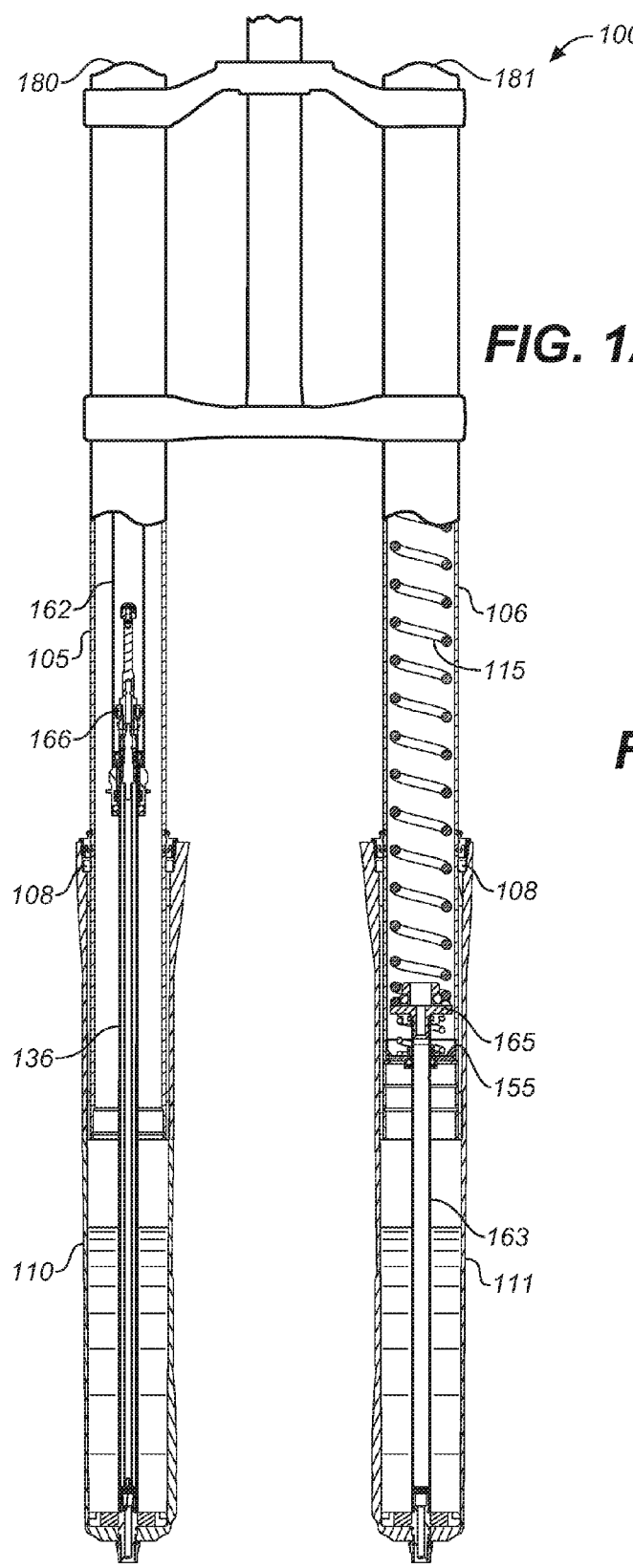
FIG. 1A depicts an asymmetric bicycle fork having a damping leg and a spring leg.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

Embodiments of vehicle suspension dampers described herein may include a valve assembly as is described in embodiments above. The valve assembly may be used to regulate damping fluid flow in different parts of the suspension damper. For example, the valve assembly may be part of a base valve in a hydraulic suspension damper, such as a suspension fork and/or rear shock for a bicycle or motorcycle. Additionally or alternatively, the valve assembly may be included as part of a main piston assembly of the vehicle suspension damper, and may be used to control damping in compression and/or rebound. Additionally or alternatively, the valve assembly may be used to regulate damping fluid flow between a main damping chamber of the damping assembly and a reservoir, the reservoir for accommodating damping fluid as a piston shaft enters the main damping chamber in compression. The principle of operation of the valve assembly has wide application in vehicle suspension dampers; for example, by scaling the size of the valve assembly appropriately, it can be used in vehicles as small and light as bicycles (e.g. in the forks and/or rear shocks), and as heavy as military vehicles.

Embodiments provide a system for controlling a vehicle's motion by increasing and/or decreasing damping forces within a vehicle suspension damper in quick response to sensed movement of the vehicle. Embodiments may be used in various types of vehicles, such as, but not limited to, bicycles, Side by Sides (four-wheel drive off-road vehicle), snow mobiles, etc. Embodiments include a set of sensors coupled with a vehicle suspension damper having an electronic valve. Embodiments provide for a quicker response time, such as selectively applying damping forces, to terrain changes than the timing of responses from conventional vehicle suspension dampers.

Conventional inertia valves of conventional vehicle suspension dampers are mechanical. The conventional mechanical inertia valve operates to respond to a terrain change by applying damping forces when a vehicle's motion is sensed. However, by the time that the mechanical inertia valve senses the vehicle motion and then actually applies the damping force, the vehicle rider has already experienced some type of response to the varied terrain. For example, the vehicle rider might feel the vehicle's initial response to running over a large rock. Mechanical inertia valves have a response time that is measured at the speed of sound or less. Thus, a shock wave from a vehicle hitting a bump will be received and felt by the vehicle rider before the mechanical inertia valve can open and provide a "soft" ride. (A "soft" vs. "hard" mode of an inertia valve is explained below.)

Embodiments of the present technology include a set of sensors attached to the vehicle to sense vehicle motion and send control signals regarding these sensed vehicle motions to a control system of a vehicle suspension damper. The control system activates a power source of the vehicle suspension damper. The power source delivers a current to the electronic valve. The current causes a pilot valve assembly of the electronic valve to either open or close, thereby creating a "hard" mode having maximum damping force or a "soft" mode that provides a moderate damping force, respectively. Of significance, embodiments also enable components therein to provide damping functions other than via responding to a current delivered from a power source. The following lists some examples of alternative embodiments that operate to provide damping functions; it should be appreciated that the list is not exhaustive. In one example, a range of damping force may be manually selected by a user by manually adjusting a needle and jet arrangement. In another example, if the valve assembly is located on the main piston 245, a position sensitive bottom-out needle arrangement may provide for a needle engaging a jet deep into the travel of the suspension, thereby influencing a damping. Another example includes a pneumatic source (e.g., air bag springs) on a semi-truck, in which the pneumatic source drives pressure in the pilot pressure chamber 1520. As the vehicle is loaded and thereby decreases the semi-truck's ride height, the air bag pressure is increased to enable the vehicle to return to the proper ride height. This increase in air pressure also corresponds to an appropriate increase in damping. Thus, in various embodiments: 1) if the set of sensors did not exist, or became inoperable for some reason, the components within embodiments are still enabled to provide damping functions; and/or 2) if the power source for some reason became unavailable, the components within embodiments are still enabled to provide damping functions. As described herein, various embodiments provide some damping function options in addition to the operation of the set of sensors in combination with the inertia valve. These options include the following: an electro-mechanical device (e.g., solenoid, latching solenoid, electric motor, piezoelectric actuator); a manually adjustable needle and jet arrangement; and a pressure signal from an outside pressure source (e.g., suspension air bag).

When a vehicle moves, a set of sensors, such as a set of accelerometers, in accordance with an embodiment, sense the vehicle's acceleration first. Subsequent to the sensing of the vehicle's acceleration, the vehicle's velocity is sensed, and then the vehicle's displacement is sensed. The set of sensors sends a control signal to the control system of the vehicle suspension damper as soon as the acceleration is sensed. Thus, in contrast to the use of conventional mechanical inertia valves, a damping force is caused to be applied by the electronic valve prior to the vehicle rider experiencing any response to terrain changes. In contrast to embodiments, the conventional mechanical inertia valve responds to a terrain change at the speed of sound or slower, such that the vehicle rider experiences a pressure wave before the conventional mechanical inertia valve is able to apply a damping force.

Additionally, and of significance, embodiments include a control or orifice block with a control orifice therein. The control orifice functions to meter fluid flowing through the vehicle suspension damper such that the control orifice provides additional damping functions. The control orifice and the advantages thereof will be described in more detail below.

Figure 14:
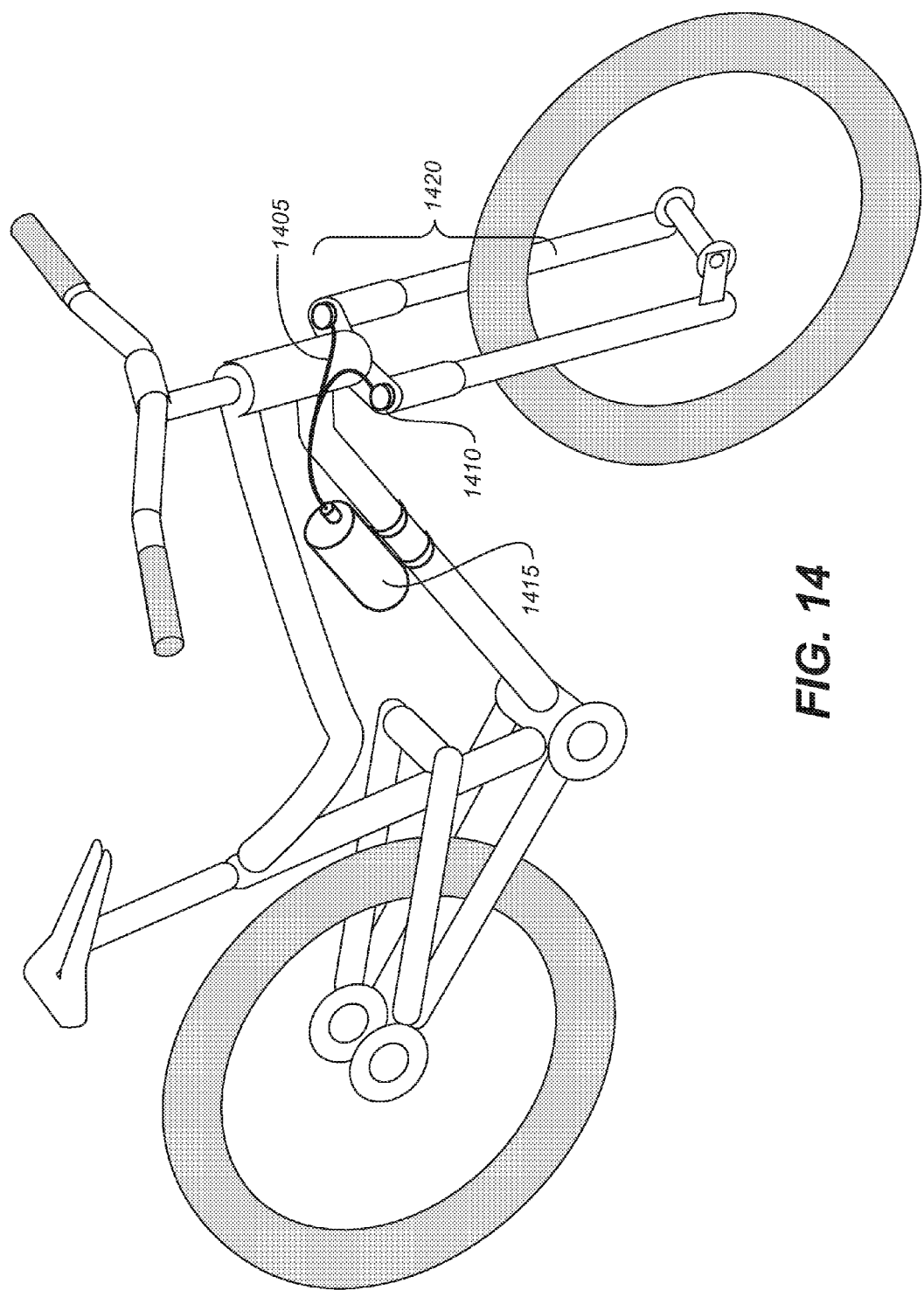
FIG. 14 depicts an arrangement of an embodiment on an example vehicle, in accordance with an embodiment.

FIG. 14 shows a bicycle 1405, in accordance with an embodiment, having attached thereto a vehicle suspension damper 1410 and a set of sensors 1415. The vehicle suspension damper 1410, in this particular embodiment, is located within the front fork 1420 of the bicycle 1405. The set of sensors 1415 is configured for sensing a type of vehicle motion, such as tilt (roll), acceleration, velocity, etc. Further, the set of sensors 1415 may be positioned anywhere on the vehicle that enables the receipt of accurate sensed information and which enables communication of a control signal (regarding the sensed information) to the vehicle suspension damper 1410.

For example, in one embodiment, if the set of sensors 1415 senses that the vehicle is experiencing acceleration, the set of sensors 1415 sends a control signal to the vehicle suspension damper 1410.

Figure 15:
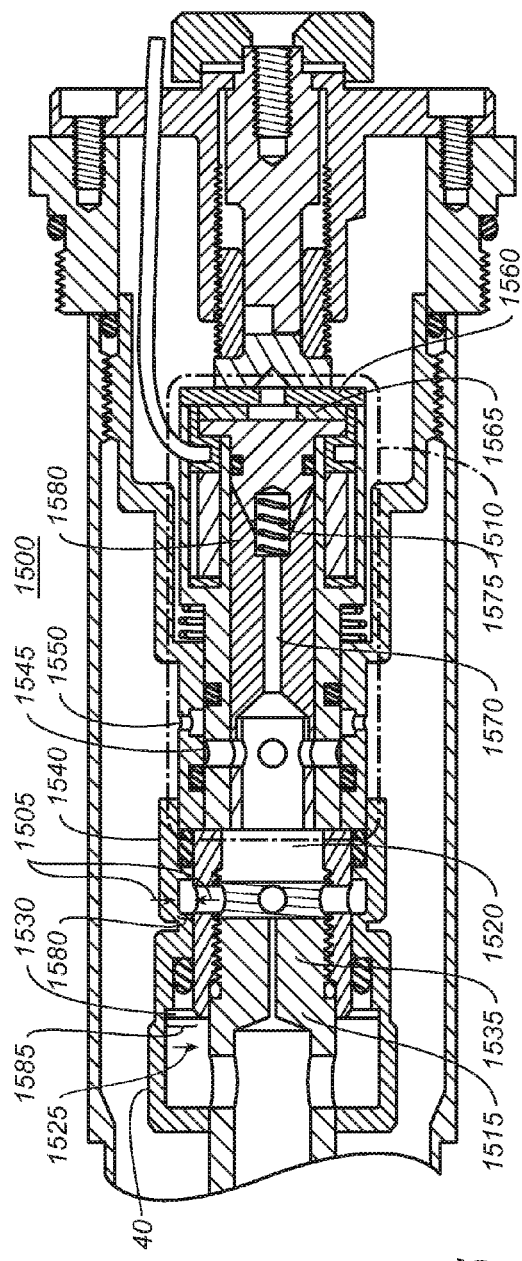
FIG. 15 depicts an example vehicle suspension damper, in accordance with an embodiment.

FIG. 15 shows the vehicle suspension damper 1410, in accordance with an embodiment. The vehicle suspension damper 1410 includes an electronic valve 1500. The electronic valve 1500 includes at least a primary valve 1505, a first pressure reducing means which in this embodiment is an orifice block 1515, and a second pressure reducing means which in this embodiment is a pilot valve assembly 1510, all of which components cooperatively control the flow of fluid throughout the inertia valve and manipulate the fluid pressure within the pilot pressure chamber 1520.

In basic operation, the permanent magnet 1560 of the solenoid assembly conducts through the component 1565 to attract the pilot spool 1570. This is the latched position as shown. The spool spring 1575 resists this condition. When the coil is turned on with positive polarity, it cancels the effect of the permanent magnet 1560 and the spool spring 1575 moves the pilot spool 1570 to the left or closed position. With negative polarity applied to the coil, the electromagnet is added to the permanent magnet 1560 and the pilot spool 1570 is drawn to the right or open position.

The main oil flow path, or first fluid flow path, is through the center of the base valve and radially outwardly into piston port area 1525. Assuming there is enough pressure in the piston ports, it then blows off the valve shims 1530 and oil flows into the reservoir 40. A small amount of oil also flows in parallel through a second fluid flow path in the inertia valve 1500, and in particular through the control orifice 1535 and through the solenoid assembly 1580. This generates a pilot pressure inside the area of the primary valve 1505.

The valve member 1540 acts to resist the valve shims 1530 from opening. This resistive force is dependent on pressure inside the area of the primary valve 1505 which is controlled by the pressure drop across the solenoid. Basically, when the solenoid is closed, there is high pressure inside the area of the primary valve 1505 (resulting in locked-out fork or firm damping, depending on the damping characteristics determined for the inertia valve 1500, as described in greater detail below). When the solenoid is open, there is low pressure inside the area of the primary valve 1505 and the valve member 1540 pushes against valve shims 1530 with less force, allowing the valve shims 1530 to open under lower fluid pressure. This open position of the solenoid provides a normally-operating fork, by which is meant the damping characteristic of the inertia valve is determined predominantly by the tuning of the valve shims 1530 (although there is some damping effect provided by the control orifice 1535).

A more particular description follows. A control signal instructs the vehicle suspension damper 1410 to increase or decrease its damping force therein. The vehicle suspension damper 1410 is configured to respond to the control signal instruction. More particularly, the inertia valve of the vehicle suspension damper 1410, in response to the control signal instruction, quickly manipulates the pressure in the pilot pressure chamber 1520 of the inertia valve by moving/adjusting itself to at least partially close or open the flow ports 1550. The pressure in the pilot pressure chamber 1520 increases or decreases in proportion to the amount of closure or opening that the flow ports 1550 experience, respectively.

In general, in embodiments, fluid in the inertia valve flows along a first fluid flow path from the damping cylinder interior 35 and through the shims 1530 (unless the shims 1530 are held closed under pressure from the valve member 1540, as will be described herein) via the piston port area 1525. Additionally, fluid also flows along a second fluid flow path from the damping cylinder interior 35 and through the control orifice 1535 of the orifice block 1515. After having flowed through the control orifice 1535, the fluid moves into the pilot pressure chamber 1520. From the pilot pressure chamber 1520, the fluid moves out of the pilot spool valve 1545 (wherein the pilot spool valve 1545 is in at least a partially open position) through a set of flow ports 1550 and into the reservoir 40. Additionally, from the pilot pressure chamber 1520, the fluid also moves into the area of the primary valve 1505. When the fluid presents a predetermined pressure against surface 1580 of the valve member 1540, a force proportional to the pressure is exerted on the valve member 1540 which urges it against the shims 1530. The valve member 1540 pushes against the shims 1530, thereby biasing the shims 1530 toward a closed position, even though fluid is moving through the shims 1530 from the piston port area 1525 and into the reservoir 40. If the force of the valve member 1540 against the shims 1530 is greater than the force of the fluid moving from the piston port area 1525 against the shims 1530, then the shims 1530 will become biased toward closing. Likewise, if the force of the fluid moving from the piston port area 1525 against the shims 1530 is greater than the force of the valve member 1540 against the shims 1530, then the shims 1530 will be biased toward an open position, in which the fluid may remain flowing through the shims 1530.

During compression of the shock absorber, in order to change the fluid pressure within the pilot pressure chamber 1520 in quick response to changes in the vehicle's position and speed, for example, embodiments use a control system to receive control signals from the set of sensors 1415. In accordance with the control signals received from the set of sensors 1415, the control system activates a power source that is attached to the inertia valve. The power source delivers a current to the inertia valve. The inertia valve responds to the delivered current by causing the pilot valve assembly 1510 to move and block or open at least a portion of the flow ports 1550 through which fluid may flow there through from the pilot pressure chamber 1520 and into the reservoir 40, thereby at least partially closing or opening the flow parts 1550.

In general, upon compression of the shock absorber, the damper piston 5 moves into the damper cylinder interior 35. More particularly, when the flow ports 1550 are at least partially closed, the fluid pressure within the pilot pressure chamber 1520 increases such that the fluid pressure in the area of the primary valve 1505 also increases. This increase in the fluid pressure in the area of the primary valve 1505 causes the valve member 1540 to move toward the shims 1530 that are open and to push against the shims 1530, thereby causing the shims 1530 to at least partially or fully close. When these shims 1530 are at least partially or fully closed, the amount of fluid flowing there through decreases or stops. The movement of the damper piston 5 into the damper cylinder interior 35 causes fluid to flow through the piston port area 1525 and hence out through open shims 1530 and into the reservoir 40. The fluid also flows through the control orifice 1535 into the pilot pressure chamber 1520. If the shims 1530 are closed due to movement of the pilot valve assembly 1510 to block the flow ports 1550, then fluid may not flow out through the shims 1530 or out through the flow ports 1550 into the reservoir 40. Consequently, the ability of the damper piston 5 to move within the damper cylinder interior 35 to cause fluid to flow through the piston port area 1525 as well as through the flow ports 1550 is reduced or eliminated. The effect of the at least partial closure of the shims 1530 is to cause a damping function to occur. Thus, the movement of the pilot valve assembly 1510 to at least partially block the flow ports 1550 causes the damping (or slowing of movement) of the damper piston 5 into the damper cylinder interior 35.

In various embodiments, the control orifice 1535 operates cooperatively with the pilot valve assembly 1510 to meter the flow of fluid to the primary valve 1505. The control orifice 1535 is a pathway within the orifice block 1515 and is positioned between the damper cylinder interior 35 and the pilot pressure chamber 1520. The size of the control orifice 1535 is tunable according to the application; the size may be variously changed. The control orifice 1535 is a key component in enabling the quick and accurate response to sensed changes in a vehicle's motion. As will be explained herein, without the presence of the control orifice 1535, the vehicle would not experience damping during periods of low compression speed, or experienced too much damping during periods of high compression speeds. The pilot valve assembly 1510 would act like a bypass. In other words, without the control orifice, at low compression speed there would almost be no damping and the pilot valve assembly 1510 would act like a bypass; but at higher compression speeds, pressure drop across the pilot valve assembly 1510 would cause a high pressure in the pilot pressure chamber 1520 and therefore too much clamping force on the shims 1530. The control orifice 1535, thus, allows damping to occur even during periods of low compression speed, and slows the damping rate during period of high compression speed.

In this particular embodiment, it was discovered that (without the control orifice 1535) if the area of the primary valve is approximately 60% or more of the area of the piston port 1525, the valve member 1540 is hydraulically locked (at all speeds) onto the shims 1530. This led to undesirable high damping force at high compression speeds. Although in this particular embodiment the hydraulic lock occurred at about 60% area ratio and higher, this may not be true in all cases: there may be arrangements where a lock occurs at a higher or lower ratio than 60%, or where no lock occurs at all at any ratio. It is expected that that the particular ratio will be dependent on design parameters such as the valve shim arrangement and main piston design.

The solution is to cause a pressure drop of damping fluid before it enters the pilot pressure chamber 1520. This is achieved with the control orifice 1535. The control orifice 1535 provides some damping effect at low compression speeds (by enabling damping fluid to 'bleed' through the control orifice), but at high compression speeds provides a significant pressure drop to ensure that the pressure inside the pilot pressure chamber does not get too high, thereby preventing the valve member 1540 from locking onto the shims 1530.

In its present form, the control orifice 1535 is between 0.5 mm and 2 mm in diameter, but these sizes are dependent on the specific application and the desired damping curve. Pressure drop is directly proportional to the length of the control orifice 1535, but inversely proportional to its diameter. Either one or both of these parameters can be changed at the design stage to affect the performance of the control orifice 1535.

The essential function, in embodiments, of the control orifice 1535 is to create a pressure drop. Therefore, anything that will do this could be used in place of the specific arrangement shown. Some possible examples include: a diffuser; a labyrinth between parallel plates; leakage past a screw thread; etc.

A further key feature of embodiments is the combination of the area of the surface 1580 inside the valve member 1540, the control orifice 1535, the pilot valve assembly 1510, and the way this combination enables a variable force to be applied to the shims 1530 to control the damping force at any point in time.

In particular, the ratio of the surface area 1585 of the shims 1530 (The surface area 1585 is next to the piston port area 1525; the pressure is acting on the surface area 1585 of the shims 1530 as well as the surface area 1580 of the inside of the valve member 1540, within the primary valve area 1505) to the area of the surface 1580 inside the valve member 1540 controls the overall damping characteristic of the inertia valve 1500, i.e., what overall range of force can be applied to the shims 1530. By selecting this ratio appropriately, the valve member 1540 can be set up to move between full lockout and a completely soft state, or between a firm damping state and a soft state, for example.

Within that overall range of force, a particular force at any point in time is set by the position of the pilot valve assembly 1510, which, as explained above, controls the pressure drop across the flow ports 1550. By adjusting the pressure drop across flow ports 1550, the pressure of fluid in the pilot pressure chamber 1520 is also adjusted. Since the pressure inside the pilot pressure chamber 1520 acts against surface 1580 of the valve member 1540, the force applied by the valve member 1540 to the shims is controllable by adjustment of the position of the pilot valve assembly 1510.

It should be noted that the overall resistance to fluid flow along the first fluid flow path (i.e. through piston port area 1525 and past shims 1530) is given by the sum of the force provided by the shims 1530, and the force applied to the shims 1530 by the valve member 1540.

A significant feature is that force is generated on the valve member 1540 by control of pressure inside the area of the primary valve 1505 (in contrast to other valve bodies where force comes from pressure acting on the outside of the valve member 1540, usually from the damper reservoir). The ultimate source of pressure in the pilot pressure chamber 1520 is the pressure of the damping fluid in the main damping cylinder 35 during compression (but regulated by the control orifice 1535 and the pilot valve assembly 1510 to give a lower pressure in the pilot pressure chamber 1520).

There are significant advantages to the combination of the ratio of the area of the surface 1580 to the area of the piston port 1525, control orifice 1535, and the pilot valve assembly 1510. Some of them are as follows: 1) the damping force generated by inertia valve 1500 is not temperature sensitive; 2) the damping force generated by inertia valve 1500 is not position sensitive; 3) when using an electro-mechanical inertia device to control the pilot valve assembly 1510, the damping force can be turned on and off very quickly (recent experiments achieved 4 ms between full firm and full soft—to the best of the applicant's knowledge and belief the fastest turning on and off of damping force in other devices is 20 ms. The reason such fast speeds are achieved is because, when the pressure in the pilot pressure chamber 1520 is released, it is the pressure in the main damper (which is the same as the fluid pressure in the piston port area 1525) that pushes on the shims 1530 and moves the primary valve assembly 1510 back (which can happen very quickly). This is in contrast to other arrangements that rely on an electric motor to move a valve body, for example, which takes more time; 4) using a latching solenoid pilot valve enables full firm state to be maintained with no power; 5) the pilot valve assembly 1510 enables very large damping forces to be controlled using the same pilot valve assembly 1510—this is because: (a) the pilot pressure is 'magnified' according to the ratio of the area of the primary valve 1505 to the area of the piston port 1525; and (b) because the pilot valve assembly 1510 is not required to move any element against the high pressure damping fluid; and 5) the primary valve assembly 1510 allows the damper to utilize conventional shims, but with some level of controllability over the damping force applied by the shims. This allows the shims to be tuned in a conventional manner. Furthermore, if power to the pilot valve assembly 1510 fails, the shock absorber will continue to operate (in contrast to other electronically controlled shocks where power loss causes the shock to stop working completely).

Thus, the inertia valve 1500, including the primary valve 1505, the pilot valve assembly 1510, and the orifice block 1515, not only enables a variable force to be applied to shims 1530, but also enables the control of the damping force within the vehicle at any point in time. The pilot valve assembly 1510 meters a flow of fluid to the primary valve 1505 and enables the generation of relatively large damping forces by a relatively small solenoid (or other motive source), while using relatively low amounts of power.

Furthermore, since the incompressible fluid inside of the primary valve 1505 of the shock absorber assembly causes damping to occur as the primary valve 1505 opens and the valve member 1540 collapses, embodiments enable both a controllable preload on the shims 1530 and a controllable damping rate. In one embodiment, and particularly in 4 wheel vehicles, the solenoid continuously powers the inertia valve and does not have a latching mechanism. In one embodiment, a monitor will continuously monitor power source and its operation in order to make sure that the wires leading to the power source do not get cut, thereby providing a dangerous situation for the rider and other vehicles.

In regards to the area of the primary valve 1505, although it is shown as an internal base valve, it is not limited to this position or application. For example, it can be mounted externally of the vehicle suspension damper (for example in a 'piggy-back' reservoir). Further, it could be made part of the main damper piston (either in compression or rebound directions).

In considering the design of the control orifice 1535, it must have at least the following two functions: provision of low speed bleed; and provision of sufficient pressure drop at high speed to prevent hydraulic lock of the valve member 1540 onto the shims 1525. The general methodology for determining the diameter and/or length of the control orifice 1535 during design is as follows: (1) identify the desired damping curve that the damper should have; (2) determine from step (1) the target low speed damping force; (3) determine from step (1) the target high speed damping force; (4) make informed guess at control orifice diameter and/or length to achieve steps (2) and (3); (5) test the output damping forces produced by shock at different speeds within low to high speed range; (6) compare the measured damping curve against the desired damping curve; (7) if there is too much high speed damping force, then reduce the diameter of the control orifice (to lower the pressure inside the pilot pressure chamber 1520); (8) if there is too much low speed damping force, then decrease the area ratio (between the area of the primary valve 1505 and the piston port area 1525), and increase the diameter of the control orifice 1535; and (9) repeat steps (5)-(8) until a good approximate to a desired damping curve is obtained. It is to be noted that in steps (7) and (8) the length of the control orifice can also be adjusted, either separately or in addition to the diameter, to achieve a similar effect.

Figure 16A:
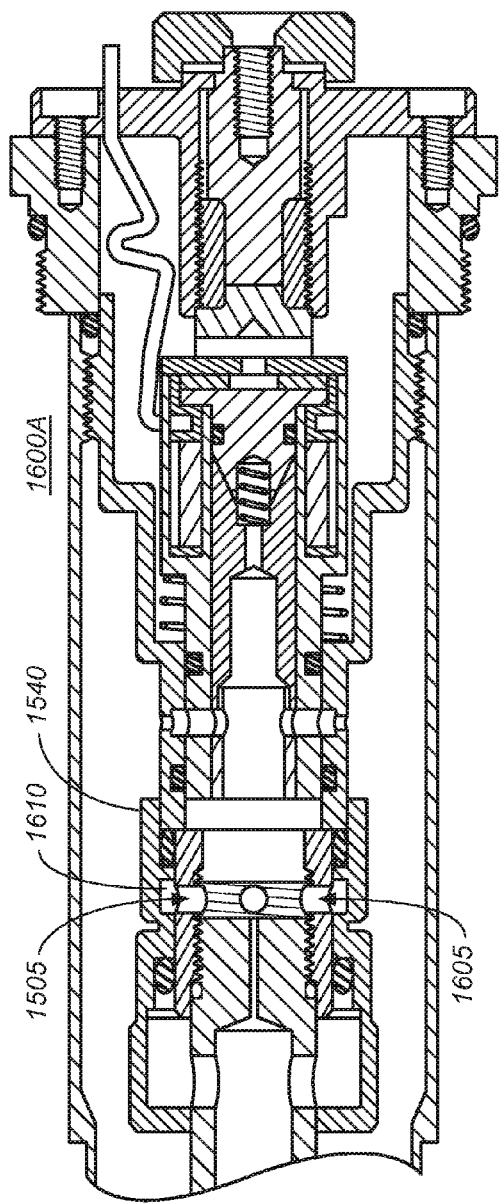
FIGS. 16A-16C depict an electronic valve, in accordance with an embodiment.
Figure 16B:
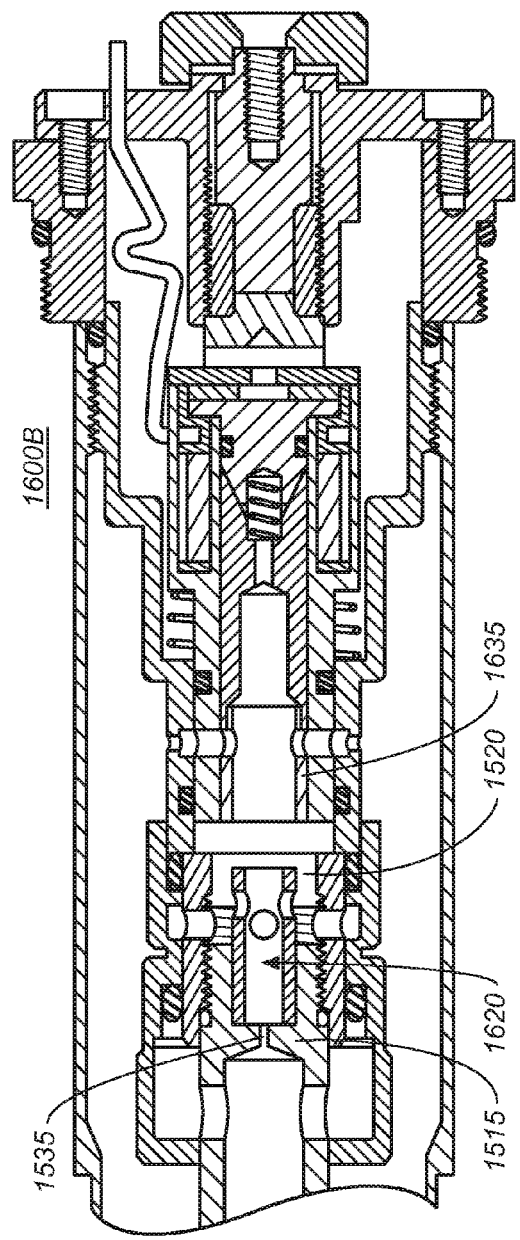
Figure 16C:
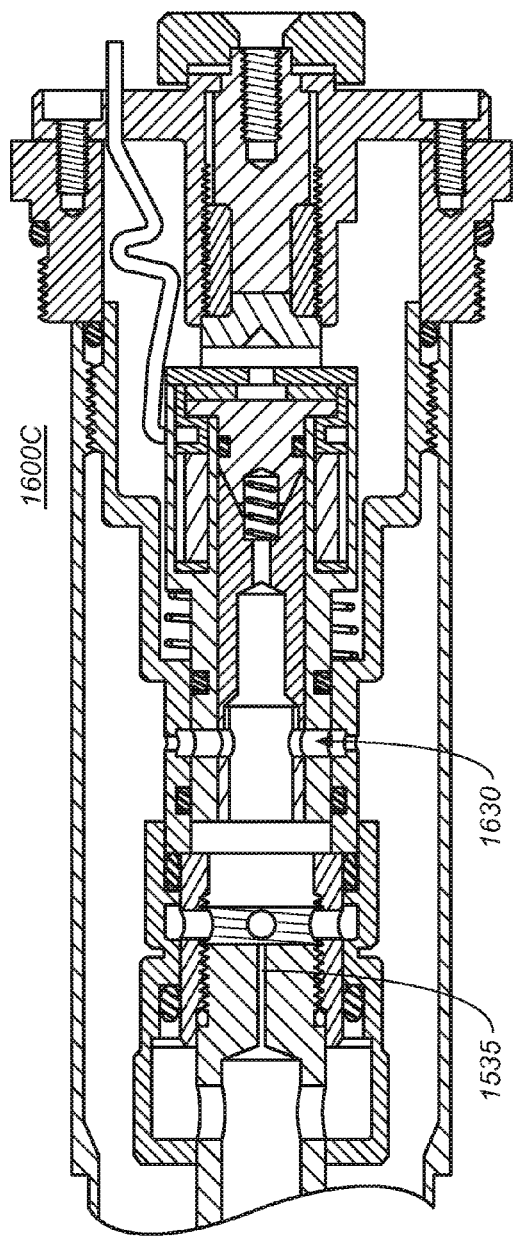

In various embodiments, it was found that the pilot valve assembly 1510 would "auto-close" at a certain oil high flow rate. In one embodiment, a diffuser pin inserted into the vehicle suspension damper downstream of the control orifice 1535 is used to eliminate this auto-closing issue. FIG. 16A shows an electronic valve 1600A with a diffuser pin 1605 positioned through one set of the cross holes 1610 going to the primary valve area 1505, in accordance with an embodiment. Another set of holes remains (normal to the page) to feed oil to the valve member 1540. The diffuser pin 1605 functions to disrupt the jet flow coming out of the control orifice 1535. FIG. 16B shows an electronic valve 1600B with a diffuser plug 1620 pressed into, at least one of and at least partially, the orifice block 1515 and the pilot pressure chamber 1520, in accordance with an embodiment. The diffuser plug 1620 also functions to disrupt the jet flow coming out of the control orifice 1535. FIG. 16C shows an electronic valve 1600C with a diffuser pin 1630, in accordance with an embodiment. In this embodiment, the spool retainer 1635 (see FIG. 16B) is replaced with the diffuser pin 1630. The diffuser pin 1630 and its position within the vehicle suspension damper 1600C functions to disrupt the jet flow coming out of the control orifice 1535 and to minimize the contact of the pilot spool assembly 1510 in the firm setting.

In another embodiment, the solenoid includes a "latching" mechanism to open and close the pressure-balanced pilot spool. Due to the latching configuration of the solenoid, power is only required to open or close the pilot valve assembly 1510. Power is not required to hold the pilot valve assembly 1510 open or closed in either setting. Consequently, embodiments enable reduced power consumption compared to the traditional shock absorber.

Further embodiments provide an externally-adjustable means of tuning the open state of the damper. An adjuster turns in or out to vary the effective orifice size of the pilot spool valve 1545 when in the open position. This allows the rider to adjust the soft setting of the damper to his preference.

In the embodiment described above in conjunction with FIGS. 14 and 15 it is to be noted that, whilst preferred, the use of a valve shims 1530 is optional. Instead, it would be possible for the valve member 1540 to act directly on the fluid flow ports 1525. In fact, valve shims are optional in any such embodiment described herein where it would be possible for the valve member 1540 (or any other similar valve member described herein) to act directly on the fluid flow ports that control the main flow through the valve assembly.

The following discussion describes the FIGS. 1-8B and embodiments shown therein.

Integrated damper/spring vehicle shock absorbers often include a damper body surrounded by or used in conjunction with a mechanical spring or constructed in conjunction with an air spring or both. The damper often consists of a piston and shaft telescopically mounted in a fluid filled cylinder. The damping fluid (i.e., damping liquid) or damping liquid may be, for example, hydraulic oil. A mechanical spring may be a helically wound spring that surrounds or is mounted in parallel with the damper body. Vehicle suspension systems typically include one or more dampers as well as one or more springs mounted to one or more vehicle axles. As used herein, the terms "down", "up", "downward", "upward", "lower", "upper", and other directional references are relative and are used for reference only.

FIG. 1A shows an asymmetric bicycle fork 100 having a damping leg and a spring leg. The damping leg includes an upper tube 105 mounted in telescopic engagement with a lower tube 110 and having fluid damping components therein. The spring leg includes an upper tube 106 mounted in telescopic engagement with a lower tube 111 and having spring components therein. The upper legs 105, 106 may be held centralized within the lower legs 110, 111 by an annular bushing 108. The fork 100 may be included as a component of a bicycle such as a mountain bicycle or an off-road vehicle such as an off-road motorcycle. In some embodiments, the fork 100 may be an "upside down" or Motocross-style motorcycle fork.

In one embodiment, the damping components inside the damping leg include an internal piston 166 disposed at an upper end of a damper shaft 136 and fixed relative thereto. The internal piston 166 is mounted in telescopic engagement with a cartridge tube 162 connected to a top cap 180 fixed at one end of the upper tube 105. The interior volume of the damping leg may be filled with a damping liquid such as hydraulic oil. The piston 166 may include shim stacks (i.e., valve members) that allow a damping liquid to flow through vented paths in the piston 166 when the upper tube 105 is moved relative to the lower tube 110. A compression chamber is formed on one side of the piston 166 and a rebound chamber is formed on the other side of the piston 166. The pressure built up in either the compression chamber or the rebound chamber during a compression stroke or a rebound stroke provides a damping force that opposes the motion of the fork 100.

The spring components inside the spring leg include a helically wound spring 115 contained within the upper tube 106 and axially restrained between top cap 181 and a flange 165. The flange 165 is disposed at an upper end of the riser tube 163 and fixed thereto. The lower end of the riser tube 163 is connected to the lower tube 111 in the spring leg and fixed relative thereto. A valve plate 155 is positioned within the upper leg tube 106 and axially fixed thereto such that the plate 155 moves with the upper tube 106. The valve plate 155 is annular in configuration, surrounds an exterior surface of the riser tube 163, and is axially moveable in relation thereto. The valve plate 155 is sealed against an interior surface of the upper tube 106 and an exterior surface of the riser tube 163. A substantially incompressible lubricant (e.g., oil) may be contained within a portion of the lower tube 111 filling a portion of the volume within the lower tube 111 below the valve plate 155. The remainder of the volume in the lower tube 111 may be filled with gas at atmospheric pressure.

During compression of fork 100, the gas in the interior volume of the lower tube 111 is compressed between the valve plate 155 and the upper surface of the lubricant as the upper tube 106 telescopically extends into the lower tube 111. The helically wound spring 115 is compressed between the top cap 181 and the flange 165, fixed relative to the lower tube 111. The volume of the gas in the lower tube 111 decreases in a nonlinear fashion as the valve plate 155, fixed relative to the upper tube 106, moves into the lower tube 111. As the volume of the gas gets small, a rapid build-up in pressure occurs that opposes further travel of the fork 100. The high pressure gas greatly augments the spring force of spring 115 proximate to the "bottom-out" position where the fork 100 is fully compressed. The level of the incompressible lubricant may be set to a point in the lower tube 111 such that the distance between the valve plate 155 and the level of the oil is substantially equal to a maximum desired travel of the fork 100.

Figure 1B:
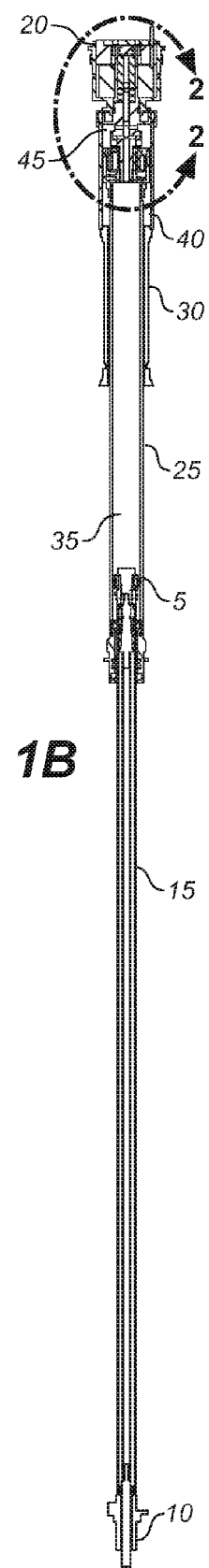
FIG. 1B depicts a cross-sectional side elevation view of a shock absorber of a bicycle fork cartridge, in accordance with an embodiment.

Referring now to FIG. 1B, a cross-sectional side elevation view of a shock absorber of a bicycle fork cartridge is depicted, in accordance with an embodiment. More particularly, FIG. 1B shows the inner portions of the bicycle fork leg assembly, comprising a damper piston 5. In practice, the top cap 20 is affixed to an upper tube (not shown) and the lower connector 10 is fixed to a lower leg tube (not shown) where the upper tube is typically telescopically mounted within the lower tube (although the reverse may also be the case). As the upper tube and the lower tube telescope in contraction or expansion in response to disparities in the terrain being traversed by a vehicle, including such for shock absorption, so also the damper piston 5 and piston rod 15 move telescopically into and out of damper cylinder 25. During compression, the volume of the piston rod 15 displaces, from the cylinder 25, a volume of damping liquid contained within the cylinder 25 corresponding to the volume of the piston rod 15 incurring into the damper cylinder 25. During extension or "rebound", the volume of liquid must be replaced as the piston rod 15 leaves the interior of the damper cylinder 25.

Damping liquid displaced as described above moves from the damper cylinder 25, through a base valve assembly of detail 2 and ultimately into an elastic bladder 30 during compression, and from the elastic bladder 30, back through the base valve assembly of detail 2 and into the damper cylinder 25 during rebound. In one embodiment, the base valve assembly of detail 2 allows for the compression damping to be adjusted by the user.

Figure 2:
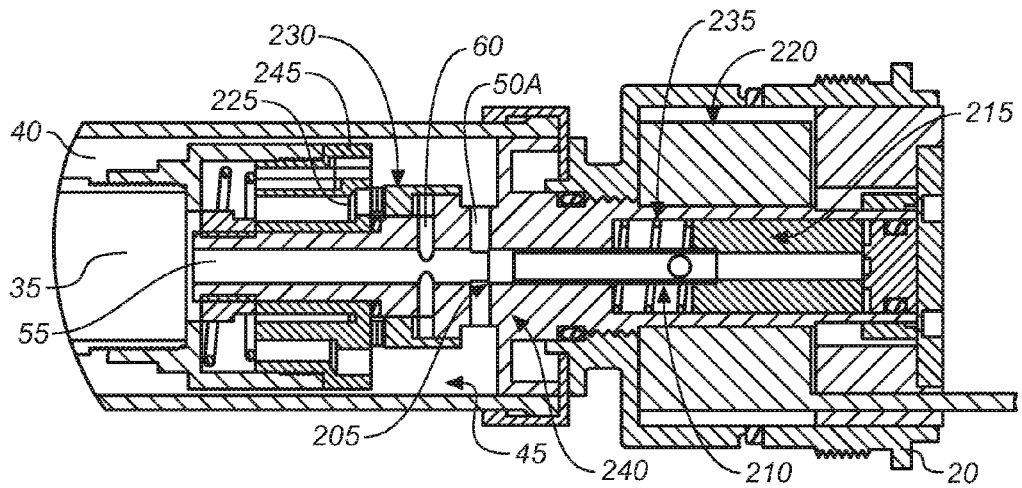
FIG. 2, FIG. 3, and FIG. 4 depict a cross-sectional side elevation view of various operational positions of an embodiment of the base valve assembly of detail 2 of FIG. 1B.
Figure 3:
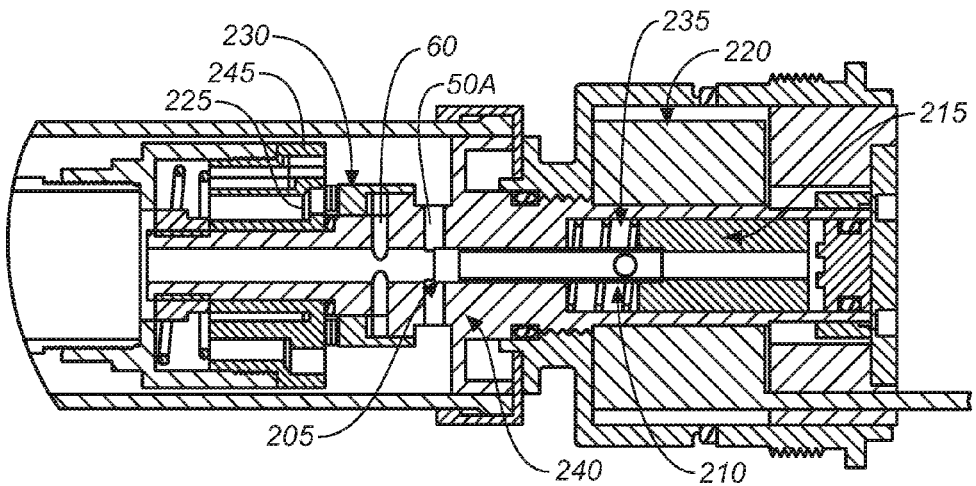
Figure 4:
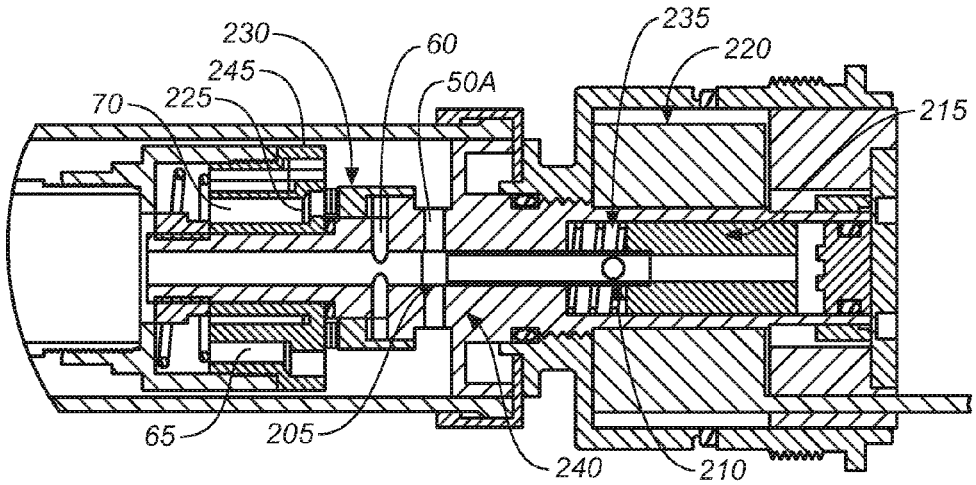

FIG. 2, FIG. 3, and FIG. 4 show cross-sectional side elevation views of various operational positions of an embodiment of the base valve assembly of detail 2 of FIG. 1B. FIGS. 2-4 show a continuously variable semi active arrangement, in accordance with embodiments, and as will be described in more detail below. In brief, a solenoid balanced by an armature biasing spring 235 axially locates a pressure-balanced pilot spool 210. The pressure-balanced pilot spool 210 controls the pressure inside the valve body 230. As this pressure is increased inside the valve body 230, the axial force of the valve body 230 on the conventional valve shim increases. Due to the pilot spool assembly arrangement, a relatively small solenoid (using relatively low amounts of power) can generate relatively large damping forces. Furthermore, due to incompressible fluid inside the valve body 230, damping occurs as the valve opens and the valve body 230 collapses. The result is not only a controllable preload on the valve stack, but also a controllable damping rate. Embodiments discussed herein may optionally be packaged in a base valve, the compression adjuster of a shock absorber, and/or on the main piston of a shock absorber.

FIG. 2 is a detailed view of the base valve assembly of detail 2 of FIG. 1B, with the valve shown in the retracted soft position. This retracted position corresponds to minimum or no current in the solenoid. In FIG. 2, a first damping fluid flow path between damping cylinder interior 35 and annular reservoir 40 (including bladder 30 interior; see FIG. 1B) is substantially unobstructed via bleed passage 55, ports 50A and upper annulus 45. (Also shown in FIG. 2 is the main piston 245.)

FIG. 3 is a detailed view of the base valve assembly of detail 2 of FIG. 1B, with the valve shown in the mid-damping position. This corresponds to medium current supplied to the solenoid. FIG. 3 shows a partial obstruction of ports 50A by metering edge 205 of the pilot spool 210.

FIG. 4 is a detailed view of the base valve assembly of detail 2 of FIG. 1B, with the valve shown in the firm-damping position. FIG. 4 shows substantial blockage of ports 50A by the metering edge 205 of the pilot spool 210, which is axially displaced relative to its position in FIG. 2.

Of note, the pilot spool 210 shown in FIG. 2 is in a retracted soft position, in which the metering edge 205 of the pilot spool 210 is not obstructing the ports 50A. However, the pilot spool 210 shown in FIG. 3 is in a middle position, in which the metering edge 205 of the pilot spool 210 is partially obstructing the ports 50A. The pilot spool 210 shown in FIG. 4 is in a firm position, in which the metering edge 205 of the pilot spool 210 is fully obstructing ports 50A.

In one embodiment, the axial displacement of the pilot spool 210 is facilitated by an electromagnetic interaction between the armature 215 and the coil 220. Adjustment of the current in the coil 220 (via modulation of the current from a power source [not shown]) to predetermined values causes the armature 215, and hence the pilot spool 210, to move in corresponding predetermined axial positions relative to the coil 220. As such, the pilot spool 210 can be adjusted as shown in the FIGS. 2-4.

When the pilot spool 210 is closing ports 50A, as shown in FIG. 4, substantially all damping fluid compression flow must flow through port 70 and valve shims 225. In addition, the damping fluid pressure acting through and in annulus 60 on an interior of the valve body 230 is increased and therefore the valve body 230 exerts more closing force of the valve shims 225. The net result is an increased compression damping due to closure of ports 50A and a further compression damping increase due to a corresponding pressure increase in the compression damping within annulus 60. When the pilot spool 210 is located in a middle position as is shown in FIG. 3, the foregoing results apply in a diminished way because some of the compression flow (albeit less than full compression flow) may flow through partially open ports 50A. The embodiment of FIG. 2 also exhibits some effect of pressure boosting via annulus 60 on the valve body 230, but the phenomenon occurs at higher compression rates.

FIG. 5A and FIG. 5B depict a cross-sectional side elevation view of a valve assembly of detail 2 of the shock absorber of FIG. 1B, in accordance with an embodiment. FIG. 5A and FIG. 5B show an embodiment in which the valve body 230 acts on the valve shims 225 through a spring 75. In use, the valve body 230 increases or decreases the preload on the spring 75. FIG. 5A shows the pilot spool 210 in the retracted soft position, thereby causing the preload on the spring 75 to decrease. FIG. 5B shows the pilot spool 210 in the firm position, thereby causing the preload on the spring 75 to increase.

Figure 6:
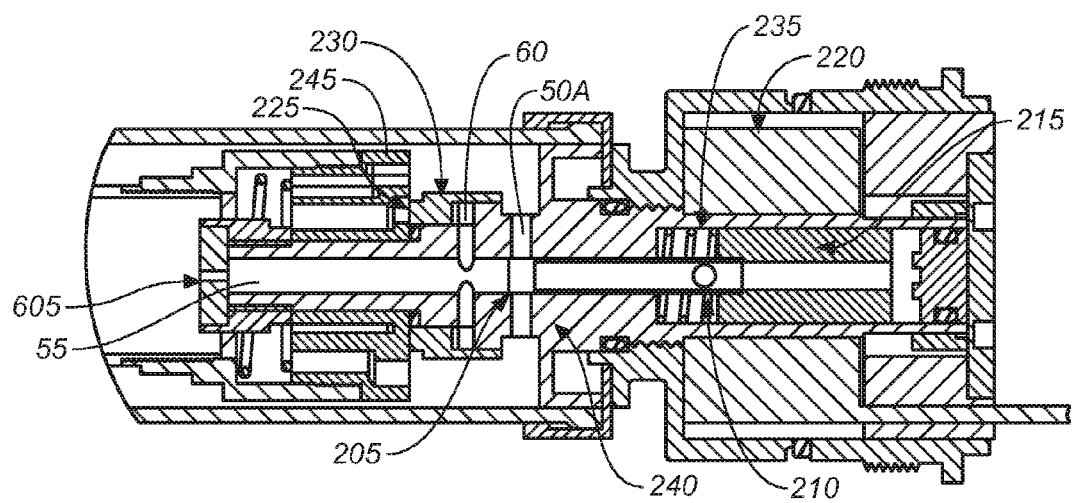
FIG. 6 and FIG. 7 each depicts a cross-sectional side elevation view of the valve assembly of detail 2 of the shock absorber of FIG. 1B, in accordance with an embodiment.
Figure 7:
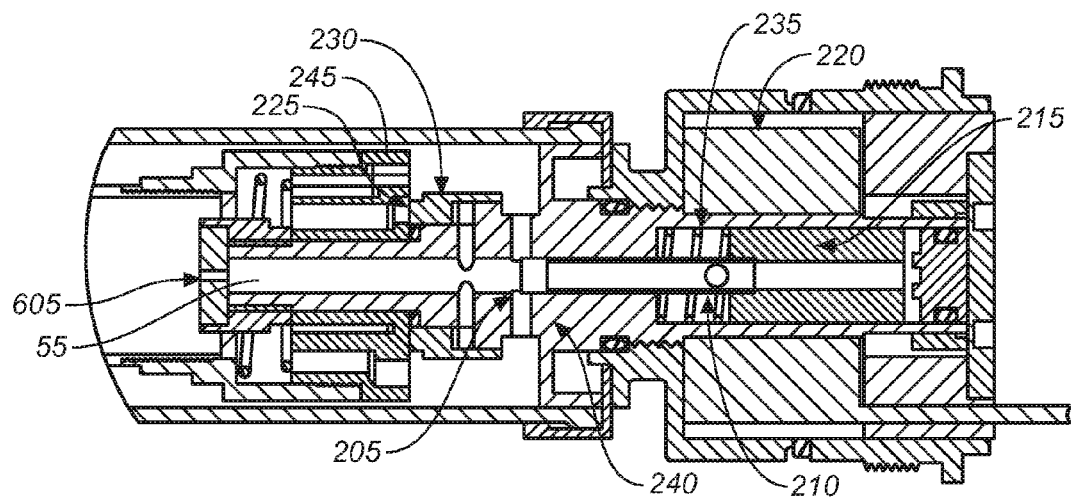

FIG. 6 and FIG. 7 depict a cross-sectional side elevation view of the valve assembly of detail 2 of the shock absorber of FIG. 1B, in accordance with an embodiment. FIG. 6 and FIG. 7 show an embodiment including a flow control orifice 605 for limiting flow through into the bleed passage 55 during compression. In limiting fluid flow, the flow control orifice 605 (by creating a pressure drop) places an upper limit on the amount of pressure in the annulus 60, and hence the amount of "boost" or closure force that the valve body 230 can exert on the valve shims 230. FIG. 6 shows the metering edge 205 of the pilot spool 210 obstructing ports 50A. FIG. 7 shows the metering edge 205 of the pilot spool 210 partially obstructing ports 50A.

Figure 8A:
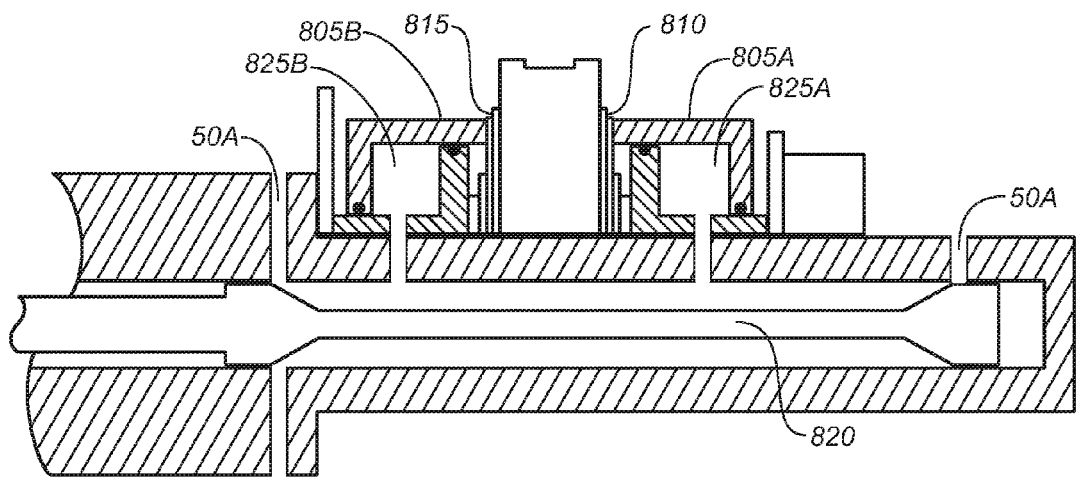
FIG. 8A and FIG. 8B depict a cross-sectional side elevation view of a shock absorber, in accordance with an embodiment.
Figure 8B:
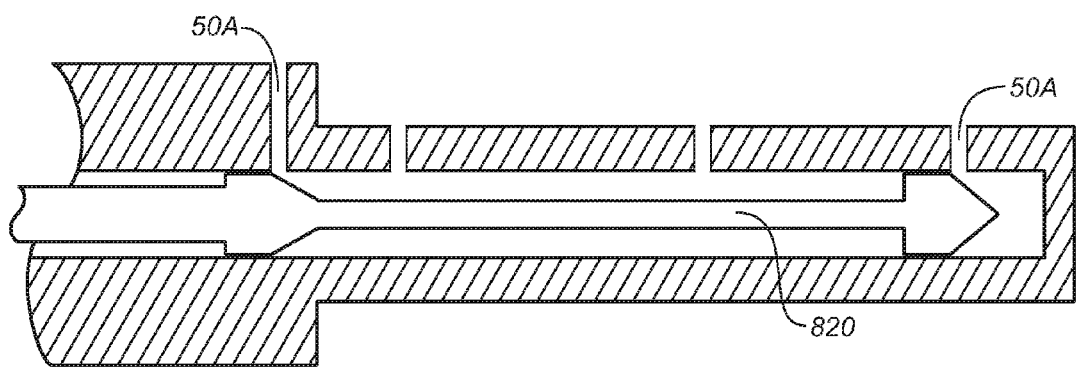

FIG. 8A and FIG. 8B depict a cross-sectional side elevation view of one end of a piston and piston rod assembly of a shock absorber, in accordance with an embodiment. More particularly, FIG. 8A shows an embodiment having a separate valve body 805A and 805B corresponding to each of a rebound shim set 810 and a compression shim set 815, respectively, where a pilot spool 820 (performing, in one embodiment, similarly to the pilot spool 210 of FIGS. 1-7 described herein) alternatingly opens one area (e.g., 825A [similar to function to annulus 60]) while closing the other area (e.g., 825B [similar in function to annulus 60]). Of note, FIG. 8A shows a "hard/soft configuration". For example, during compression, the area 825A and area 825B experience obstruction by a portion of the pilot spool 820, thereby creating a soft compression. During the rebound, the area 825A and area 825B are open to fluid flow, thereby creating a firm rebound. Thus, there would be a high amount of pressure experienced during rebound. However, for compression, the pressure is low, but there is no bleed. FIG. 8B shows a "hard/hard configuration" (a firm compression and a firm rebound), in accordance with an embodiment.

FIGS. 9-13 depicts a cross-sectional side elevation view of the base valve assembly of detail 2 of FIG. 1B, including a "latching solenoid", in accordance with an embodiment. Embodiments further provide, in brief and as will be described below, a low-power bi-state electronic damper. The low-power bi-state electronic damper uses a latching solenoid to open and close a pressure-balanced pilot spool. Given the latching configuration of the solenoid, power is required only to open or close but not to hold in it in either setting, in accordance with an embodiment. The result is low power consumption.

Additionally, a further embodiment provides an externally-adjustable means of tuning the open state of the damper. There is an adjuster that can be turned in or out to vary the effective orifice size of the pilot spool when in the open position. This will allow the rider to adjust the soft setting of the damper to his/her preference.

Figure 9:
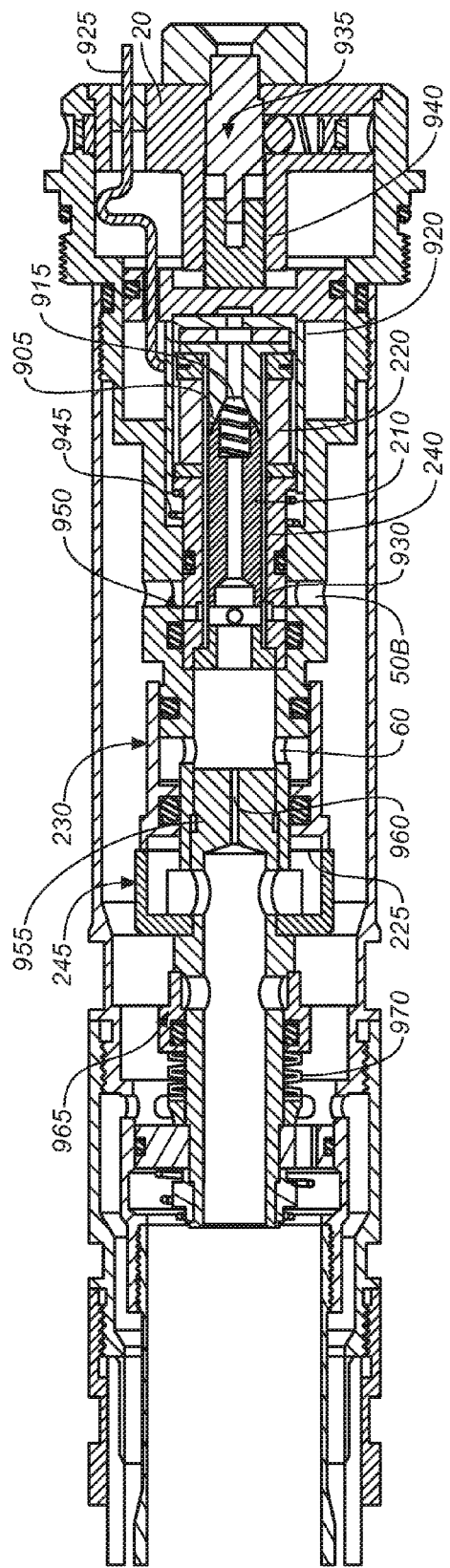
Figure 12:
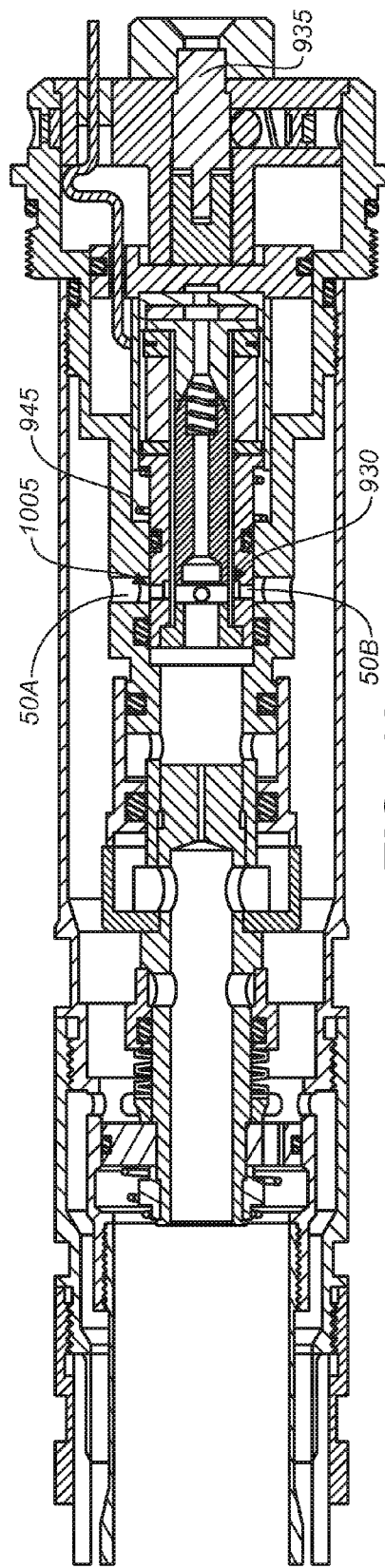

With reference now to FIG. 9, the latching solenoid 905 primarily uses power to facilitate a change in position of the pilot spool 210 relative to the coil 220 but requires little or no power to maintain the pilot spool 210 in the desired position once that is achieved. In one embodiment, the latching solenoid assembly 905 (or latching spool valve assembly) includes: a pilot spool 210 which includes a magnetically active material; a spring 915 which is normally in compression and biases the pilot spool 210 toward a position obstructing ports 50A; a permanent magnet 920; and a coil 220 where power is supplied to the coil 220 by (in one embodiment) wires 925. The aforementioned components may be contained within a housing 240 or "cartridge" as shown.

The pilot spool valve assembly (including at least the pilot spool 210 and the metering edge 930 of the pilot spool 210) regulates damping fluid flow through a portion of the damper and adjusts the force applied to the valve shims 225 by the valve body 230 through ports 60. In one embodiment, the position of the spool valve assembly may be adjusted axially by means of the low speed adjuster 935. The low speed adjuster 935 (comprising multiple pieces), being for example, threaded at its lower end to the top cap 20 via the low speed adjuster threads 940, may be rotated to facilitate axial movement. In one embodiment, the low speed adjuster 935 includes a non-round shape (e.g., hexagonal) that facilitates the rotation with relative axial movement (see 1105 of FIG. 11).

With reference now to FIGS. 9-13, when the lower portion of the low speed adjuster 935 moves downward axially, the cartridge of the pilot spool 210 is correspondingly moved and thereby further compresses the spring 915. As the cartridge is moved downward, the low speed adjuster metering edge 950 is moved into further obstruction of ports 50B, thereby restricting flow of damping fluid through the damper from an interior of the pilot spool valve assembly to an exterior of the damping assembly (note the open ports 50B shown in FIG. 12, in which the pilot spool valve 920 is shown in the open pilot position with the low speed adjuster 935 in the soft position).

Figure 13:
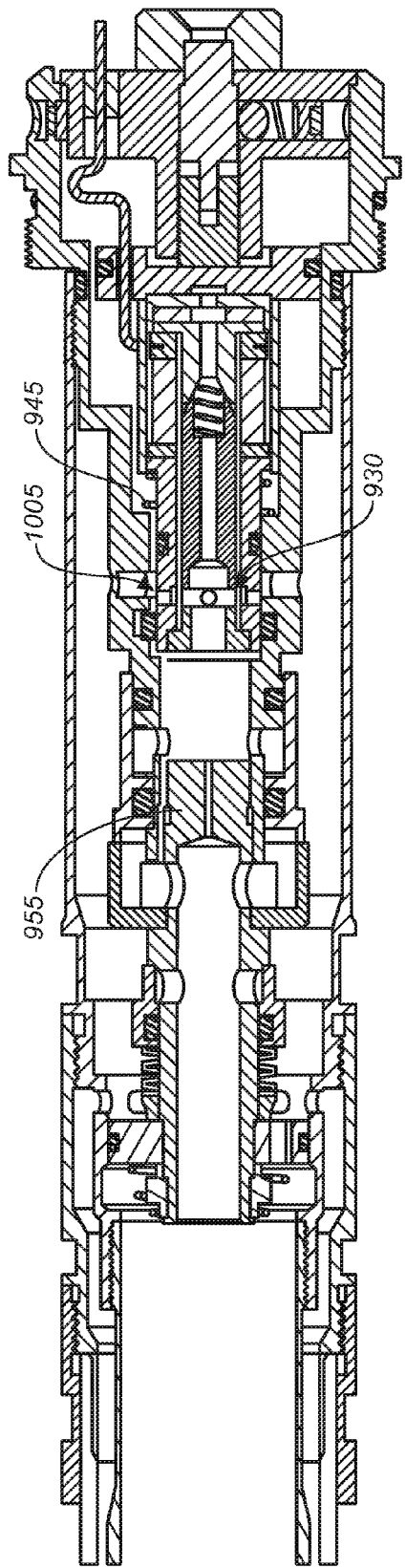

In one embodiment, the pilot spool 210 is biased by spring 915 toward a position wherein the metering edge 930 of the pilot spool 210 further obstructs ports 50A (see FIG. 13, wherein the pilot spool 210 is shown in the open pilot position with the low speed adjuster 935 in the middle position). A force opposing the bias of the spring 915 is exerted on the magnetic component of the pilot spool 210 by the permanent magnet 920. When the pilot spool 210 is in its uppermost (corresponding to open ports 50A) position, it is retained by the magnetic force between the permanent magnet 920 and the pilot spool valve 925 where that force is sufficient to overcome the bias of the spring 915 (thereby holding the spring 915 in a compressed state). As such, when the pilot spool valve 925 and ports 50A are in the open position (see FIG. 12), no power input is required to maintain that state.

In one embodiment, when it is desired to close or partially close ports 50A by means of the metering edge 930 of the pilot spool 210, a current is applied to the coil 220 via the wires 925. The current causes a magnetic flux around the coil 220, which acts on the magnetic component of the pilot spool 210 causing the pilot spool 210 to move axially within the cartridge. When the pilot spool 210 has moved a relatively small distance axially away from the permanent magnet 920, the spring 915 bias moves the pilot spool 210 toward closure of ports 50A with little or no additional power input to the coil 220.

Of note, FIG. 10 shows the pilot spool 210 in the closed pilot position with the low speed adjuster 935 in the firm position. FIG. 11 shows the pilot spool 210 in the open pilot position with the low speed adjuster 935 in the firm position. FIG. 10 additionally shows the low speed adjuster metering edge 1005 and the spool valve assembly housing 1010, in accordance with an embodiment.

FIGS. 9-13 show an orifice block 955 having a tailored orifice 960 there through. The orifice 960 meters low speed damping fluid for low speed bump response of the suspension (when magnitude and rate is insufficient to open the shims). The size of the orifice 960 may be chosen to allow a desired amount or range of pressure to be applied to the valve body 230 through annulus 60 (ports). The use of the pilot spool 210 then further specifies that the pressure acts on the valve body 230 by modulating the flow restriction "downstream" (during a compression stroke of the suspension) of the orifice 960.

FIGS. 9-13 also show a pressure relief valve 965 or "blow off" valve, which is biased toward a closed position by Bellville spring(s) 970. The pressure relief valve 965 opens in response to an interior damper pressure above a predetermined threshold and thereby prevents damage to the damper and vehicle in the event of rapid pressure build up (usually associated with extreme suspension compression rate). The pressure relief valve 965 may have an adjustable threshold value (in one embodiment, by modification of the compression in the Bellville spring 970).

With reference again to FIGS. 14 and 15, it should be again noted that the set of sensors 1415 may be positioned in various locations on various types of vehicles. For example, in one embodiment, the set of sensors 1415 is positioned on the seat post of a bicycle. In another embodiment, a first set of sensors is positioned near the front wheel, while a second set of sensors is positioned near the rear wheel.

In one embodiment, the set of sensors includes three accelerometers. The accelerometers define a plane of the vehicle's body, such that the acceleration and the tilt (i.e., pitch and roll) of the vehicle body may be measured. When the set of sensors senses vehicle motion which is determined to meet and/or exceed a predetermined threshold, then the set of sensors sends a control signal to the control system attached to the vehicle suspension damper. The predetermined threshold may be a constant in one embodiment. However, in another embodiment, the predetermined threshold may be a variable based on other situations sensed on the vehicle. Once a control signal is received by the power source, the power source that is attached to the vehicle suspension damper becomes activated. Upon activation, the power source sends a current to the vehicle suspension damper, thereby causing the pilot valve assembly to move, as was described herein. Various methods of sensing via accelerometers and other forms of motion via sensors are known in the art.

As described herein, the vehicle upon which a set of sensors and a vehicle suspension damper may be attached may be a bicycle, a Side by Side, a snowmobile, etc. In the situation in which the vehicle is a Side by Side, such as a recreational off highway vehicle (ROV), more than one set of sensors may be used. For example, each wheel base (4) may include an embodiment of the system of the present technology. More specifically, each wheel base has attached thereto a different set of sensors, such as a set of accelerometers, each set being attached to a separate vehicle suspension damper. In another embodiment, one set of sensors (e.g., set of accelerometers) is attached to the ROV, as well as being attached to one or more vehicle suspension dampers.

If the ROV is traveling along a path that does not have any bumps or uneven terrain, then the vehicle suspension dampers may each be programmed to operate in a fully open mode (i.e., soft mode), in which the pilot spool valve 1545 of the pilot valve assembly 1510 is open to the flow ports 1550, thereby allowing fluid to flow from the damper cylinder interior 35 and into the reservoir 40 either through the first fluid flow path, with resistance provided by the shims 1530 (and no additional force provided by the valve member 1540), and/or through the control orifice 1535 that permits low speed bleed of damping fluid via the second fluid flow path. Thus, for example, when the right front tire of an ROV hits a large rock, the right front tire and a portion of the suspension attached to the tire (or attached wheel base) may rise upwards to move over the rock. The set of sensors attached to the ROV's right front side will sense the tire's upward movement, and will sense the tire reaching its peak upward movement (the peak of the rock), and will sense the tire beginning to move downwards. In one embodiment, the set of sensors on the ROV's right front side would send control signals to the vehicle suspension damper attached to the ROV's right front side throughout the tire's movement upward and downward. The control system attached to the vehicle suspension damper receives the control signals and causes the power source also attached to the vehicle suspension damper to deliver a current to the vehicle suspension damper in accordance with the control signals. In one embodiment, the delivered current functions to cause the pilot valve assembly 1510 to move to cause the flow ports 1550 to be at least partially blocked. As described herein, the pressure within the pilot pressure chamber 1520 increases due to the at least partially blocked flowports 1550, thereby causing the pressure within the area of the primary valve 1505 to increase. The valve member 1540, in response increased pressure in the area of the primary valve 1505, is urged against the shims 1530, thereby changing the damping characteristics of the shims 1530. Thus, the fluid flowing along the first fluid flow path from the damper cylinder interior 35 and through the piston port area 1525 is reduced, resulting in an increased damping effect to the vehicle's motion.

Embodiments enable a faster reaction time in applying damping than conventional shock absorbers provide. For example, in conventional mechanical inertia valves, the inertia valve senses a pressure wave (occurring at the speed of sound) after a vehicle's tire hits a bump. The mechanical inertia valve opens in response to receiving the pressure wave. However, the vehicle rider experiences some form of response to the terrain before the mechanical inertia valve has a chance to open into a "soft" mode. In embodiments using an electronic valve attached to accelerometers, the inertia valve opens into a "soft" mode before a motion significant enough for a vehicle rider to experience it has begun. For example, when a motion occurs, such as an ROV wheel base beginning to move upward while running over a large rock, and thus experience a gross wheel movement, an acceleration occurs first and is thus measured first by embodiments. A velocity, and then a displacement follows and are also measured in some embodiments. A control signal is sent from the set of accelerometers to the control system before enough of a vehicle motion has occurred such that the vehicle rider experiences a minimal response to the terrain and certainly less than would be provided should a mechanical inertia valve be provided. It should be appreciated that one or more set of sensors may be attached to each ROV wheel base, and independently control the vehicle suspension damper to account for and respond to various rolls and other types of vehicle motion. Embodiments enable the quick response to sensed acceleration such that the acceleration may be prevented, or at least reduced.

In one embodiment, one or more motion sensor is provided on a forward or front part of a vehicle, and a signal or signals from the one or more motion sensor is used to control a damper mounted on a rear part of the vehicle. In use, motion information learned from the movement of the front part of the vehicle can be used to anticipate movement of the rear part of the vehicle, and adjustments made to control the damper on the rear part accordingly.

Thus, one embodiment enables the control of both compression and the rebound state of the vehicle suspension damper, such that acceleration as measured at each wheel base is maintained as close to zero as possible throughout off-road riding over varied terrain. Embodiments enable the quick recovery from and/or prevention of a vehicle rider experiencing a vehicle's response to terrain, such as a roll.

In another embodiment, more than one type of sensor is used. For example and not limited to such example, an accelerometer and a gyrometer may be used. It should also be noted that numerous methods for determining orientation in a plane in space using a sensor attached to an object are well known in the art.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What we claim is:

1. A system for controlling vehicle motion, said system comprising:
    a first set of sensors coupled with a vehicle, said first set of sensors sensing said vehicle motion; and
    a vehicle suspension damper coupled with said first set of sensors, said vehicle suspension damper adjusting a damping force therein, said vehicle suspension damper comprising:
        a primary valve;
        a pilot valve assembly coupled with said primary valve, said pilot valve assembly metering a flow of fluid to said primary valve, in response to at least said sensing of said vehicle motion; and
    an orifice block coupled with said primary valve, said orifice block comprising:
        a control orifice there through, wherein said control orifice comprises:
            a fluid flow pathway having a first end fluidly coupled with a first fluid chamber of an interior of a damping cylinder of said vehicle suspension damper and a second end fluidly coupled to a second fluid chamber adjacent to said primary valve, wherein said flow of said fluid is directed from said second fluid chamber to said primary valve.

2. The system of claim 1, wherein said pilot valve assembly performs said metering said flow of fluid to said primary valve in response to at least any of the following: an electro-mechanical device; a manually adjustable needle and jet arrangement; and a pressure signal from an outside pressure source.

3. The system of claim 1, wherein said system further comprises:
    a pressure relief valve covering a fluid port, said pressure relief valve being biased in a closed position by a set of springs coupled therewith, and configured for opening in response to an interior damper pressure against said pressure relief valve being above a predetermined threshold, and wherein upon opening of said pressure relief valve, a portion of said fluid flows through said fluid port to reduce said interior damper pressure.

4. The system of claim 1, wherein said control orifice further controlling bleed at low shaft speeds.

5. The system of claim 1, wherein said control orifice further reducing a pressure within said primary valve at high shaft speeds.

6. The system of claim 1, wherein said first set of sensors comprises:
a set of accelerometers.

7. The system of claim 1, wherein said first set of sensors producing a control signal based upon sensed vehicle motion.

8. The system of claim 7, further comprising:
a power source coupled with said vehicle suspension damper; and
a control system coupled with said power source and said vehicle suspension damper, said control system receiving a control signal from sensors coupled with said vehicle and for selectively activating said power source, wherein upon a selective activation of said power source, said power source delivers a current to said vehicle suspension damper.

9. The system of claim 8, further comprising:
an adjuster moving a pilot valve of said pilot valve assembly upon a receipt of said current.

10. The system of claim 8, wherein said sensors comprise:
said first set of sensors.

11. The system of claim 8, wherein said sensors comprise:
a second set of sensors coupled with said vehicle and said vehicle suspension damper, said second set of sensors sensing said vehicle motion, wherein said second set of sensors is different from said first set of sensors.

12. The system of claim 8, wherein said power source comprises:
a solenoid.

13. The system of claim 1, wherein said pilot valve assembly comprises:
an adjustable pilot spool controlling a pressure inside said primary valve.

14. The system of claim 13, wherein said adjustable pilot spool comprises:
an electromagnetic pilot spool valve.

15. The system of claim 13, wherein said vehicle suspension damper further comprises:
a set of shims adjacent to said primary valve, wherein a position of said adjustable pilot spool corresponds to an increase of pressure inside said primary valve and an increase of an axial force on said set of shims.

16. The system of claim 1, wherein said vehicle suspension damper further comprises:
an armature coupled with said adjuster and said pilot valve assembly; and
a coil, wherein said coil electromagnetically interacts with said armature in response to a current delivered from a power source, wherein when said armature moves, an adjustable pilot spool of said pilot valve assembly moves in corresponding axial positions relative to said coil.

17. The system of claim 16, wherein an amount of said current to be delivered by said power source is predetermined.

18. The system of claim 17, wherein said power source comprises:
a solenoid.

19. A system for controlling vehicle motion, said system comprising:
a first set of sensors coupled with a vehicle, said first set of sensors sensing said vehicle motion; and
a vehicle suspension damper coupled with said first set of sensors, said vehicle suspension damper adjusting a damping force therein, said vehicle suspension damper comprising:
a primary valve;
a pilot valve assembly coupled with said primary valve, said pilot valve assembly metering a flow of fluid to said primary valve, in response to at least said sensing of said vehicle motion;
an orifice block coupled with said primary valve, said orifice block comprising:
a control orifice there through, wherein said control orifice comprises:
a fluid flow pathway having a first end fluidly coupled with a first fluid chamber of an interior of a damping cylinder of said vehicle suspension damper and a second end fluidly coupled to a second fluid chamber adjacent to said primary valve, wherein said flow of said fluid is directed from said second fluid chamber to said primary valve;
a damper cylinder;
a base valve assembly comprising said pilot valve assembly, said primary valve, and said orifice block;
an elastic bladder; and
a first fluid flow path providing a first fluid pathway for a movement of a first portion of said fluid through and between said damper cylinder, said base valve assembly, and said elastic bladder, wherein during at least one of a compression and a rebound of said vehicle suspension damper, said first portion of said fluid flows through said first fluid flow path, and during a damping of said compression and said rebound, said pilot valve assembly at least partially obstructs said first fluid flow path.

20. The system of claim 19, wherein said pilot valve assembly comprises:
a pilot spool obstructing a first flow port within said first fluid flow path between said damper cylinder and said elastic bladder.

21. The system of claim 20, wherein said vehicle suspension damper further comprises:
a second damping fluid flow path providing a second fluid pathway for a movement of a second portion of said fluid from said damper cylinder, into said base valve assembly, such that said second portion of said fluid applies pressure against said primary valve, when said pilot valve assembly at least partially obstructs said first fluid flow path.

* * * * *

UNITED STATES PATENT AND TRADEMARK OFFICE
CERTIFICATE OF CORRECTION

| | |
|---|---|
| PATENT NO. | : 10,060,499 B2 |
| APPLICATION NO. | : 13/934067 |
| DATED | : August 28, 2018 |
| INVENTOR(S) | : Ericksen et al. |

It is certified that error appears in the above-identified patent and that said Letters Patent is hereby corrected as shown below:

On the Title Page

Page 6, Column 1 (56) Foreign Patent Documents, Lines 6 and 7:
Delete: "JP 34203540 A 7/1992
　　　　 JP 35149364 A 6/1993"
Insert: --JP 04203540 A 7/1992
　　　　 JP 05149364 A 6/1993--

Signed and Sealed this
Twenty-third Day of October, 2018

Andrei Iancu
*Director of the United States Patent and Trademark Office*